United States Patent
Huang et al.

(10) Patent No.: US 12,442,821 B2
(45) Date of Patent: Oct. 14, 2025

(54) KIT OF IN VITRO QUANTIFYING LARGE SURFACE PROTEIN OF HEPATITIS B VIRUS (HBV), BIOMARKER SET FOR ANALYZING PHASES OF HBV INFECTION AND HEPATOMA PROGNOSIS, AND SET OF MONOCLONAL ANTIBODIES FOR PREDICTING, DIAGNOSING OR TREATING CHRONIC LIVER DISEASE

(71) Applicant: NATIONAL CHENG KUNG UNIVERSITY, Tainan (TW)

(72) Inventors: Wen Ya Huang, Tainan (TW); Chia Jui Yen, Tainan (TW); Yun-Ping Lee, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 735 days.

(21) Appl. No.: 17/854,736

(22) Filed: Jun. 30, 2022

(65) Prior Publication Data
US 2023/0018242 A1    Jan. 19, 2023

Related U.S. Application Data

(60) Provisional application No. 63/217,300, filed on Jul. 1, 2021.

(51) Int. Cl.
*G01N 33/576* (2006.01)

(52) U.S. Cl.
CPC ..... *G01N 33/5764* (2013.01); *G01N 2333/02* (2013.01)

(58) Field of Classification Search
None
See application file for complete search history.

(56) References Cited

U.S. PATENT DOCUMENTS

| | | | | |
|---|---|---|---|---|
| 6,555,311 | B1 * | 4/2003 | Locarnini | C12N 9/1276 435/235.1 |
| 6,589,534 | B1 * | 7/2003 | Shaul | C07K 14/47 536/23.6 |
| 11,497,808 | B2 * | 11/2022 | Balsitis | C12N 9/1252 |
| 2009/0017443 | A1 * | 1/2009 | Ohue | G01N 33/5761 435/5 |

FOREIGN PATENT DOCUMENTS

EP    0456215 A1    11/1991

OTHER PUBLICATIONS

David A Armbruster et al., "Limit of Blank, Limit of Detection and Limit of Quantitation" Clin Biochem Rev, Aug. 2008, pp. S49-S52, vol. No. 29, Suppl (i).

European Association for the Study of the Liver "EASL 2017 Clinical Practice Guidelines on the management of hepatitis B virus infection" Journal of Hepatology, 2017, pp. 370-398, vol. No. 67.

\* cited by examiner

*Primary Examiner* — Agnieszka Boesen
(74) *Attorney, Agent, or Firm* — McBee Moore & Vanik, IP, LLC

(57) ABSTRACT

The present invention relates to a kit of in vitro quantifying large surface protein of hepatitis B virus (LHBS). The kit includes monoclonal antibodies having respective binding specificity for specific regions of LHBS, thereby increasing sensitivity and dynamic breadth of detecting LHBS in a biological sample. Moreover, the invention also provides a biomarker set corresponding to the specific regions of LHBS, and the biomarker set can be specifically recognized by the monoclonal antibodies, for non-invasively analyzing phases of HBV infection and hepatoma prognosis in a biological sample. Furthermore, the invention also provides a set of monoclonal antibodies for predicting, diagnosing or treating a chronic liver disease via those biomarkers in a subject in need thereof.

16 Claims, 12 Drawing Sheets
(1 of 12 Drawing Sheet(s) Filed in Color)

Specification includes a Sequence Listing.

SEQUENCE LISTING

```
<160> NUMBER OF SEQ ID NOS: 33

<210> SEQ ID NO 1
<211> LENGTH: 14
<212> TYPE: PRT
<213> ORGANISM: Artificial sequence
<220> FEATURE:
<223> OTHER INFORMATION: amino acid 25 to 38 of LHBS

<400> SEQUENCE: 1

Phe Pro Asp His Gln Leu Asp Pro Ala Phe Gly Ala Asn Ser
1               5                   10

<210> SEQ ID NO 2
<211> LENGTH: 23
<212> TYPE: PRT
<213> ORGANISM: Artificial sequence
<220> FEATURE:
<223> OTHER INFORMATION: amino acid 152 to 174 of LHBS

<400> SEQUENCE: 2

Asn Pro Ala Pro Asn Ile Ala Ser His Ile Ser Ser Ile Ser Ala Arg
1               5                   10                  15

Thr Gly Asp Pro Val Thr Asn
            20

<210> SEQ ID NO 3
<211> LENGTH: 38
<212> TYPE: PRT
<213> ORGANISM: Artificial sequence
```

```
<220> FEATURE:
<223> OTHER INFORMATION: amino acid 251 to 288 of LHBS

<400> SEQUENCE: 3

Leu Arg Arg Phe Ile Ile Phe Leu Phe Ile Leu Leu Leu Cys Leu Ile
1               5                   10                  15

Phe Leu Leu Val Leu Leu Asp Tyr Gln Gly Met Leu Pro Val Cys Pro
            20                  25                  30

Leu Ile Pro Gly Ser Thr
        35

<210> SEQ ID NO 4
<211> LENGTH: 9
<212> TYPE: PRT
<213> ORGANISM: Artificial sequence
<220> FEATURE:
<223> OTHER INFORMATION: CDR1 amino acid sequence of heavy chain of
      Pre-S1 antibody

<400> SEQUENCE: 4

Gly Tyr Ser Ile Thr Ser Asp Tyr Ala
1               5

<210> SEQ ID NO 5
<211> LENGTH: 7
<212> TYPE: PRT
<213> ORGANISM: Artificial sequence
<220> FEATURE:
<223> OTHER INFORMATION: CDR2 amino acid sequence of heavy chain of
      Pre-S1 antibody

<400> SEQUENCE: 5

Ile Arg Tyr Ser Gly Thr Thr
1               5

<210> SEQ ID NO 6
<211> LENGTH: 9
<212> TYPE: PRT
<213> ORGANISM: Artificial sequence
<220> FEATURE:
<223> OTHER INFORMATION: CDR3 amino acid sequence of heavy chain of
      Pre-S1 antibody

<400> SEQUENCE: 6

Ala Arg Gly Gly Thr Gly Leu Thr Tyr
1               5

<210> SEQ ID NO 7
<211> LENGTH: 6
<212> TYPE: PRT
<213> ORGANISM: Artificial sequence
<220> FEATURE:
<223> OTHER INFORMATION: CDR1 amino acid sequence of kappa light chain
      of Pre-S1 antibody

<400> SEQUENCE: 7

Glu Asn Val Gly Thr Tyr
1               5

<210> SEQ ID NO 8
<211> LENGTH: 3
<212> TYPE: PRT
<213> ORGANISM: Artificial sequence
<220> FEATURE:
<223> OTHER INFORMATION: CDR2 amino acid sequence of kappa light chain
      of Pre-S1 antibody
```

```
<400> SEQUENCE: 8

Gly Ala Ser
1

<210> SEQ ID NO 9
<211> LENGTH: 9
<212> TYPE: PRT
<213> ORGANISM: Artificial sequence
<220> FEATURE:
<223> OTHER INFORMATION: CDR3 amino acid sequence of kappa light chain
      of Pre-S1 antibody

<400> SEQUENCE: 9

Gly Gln Thr Tyr Asn Tyr Pro Phe Thr
1               5

<210> SEQ ID NO 10
<211> LENGTH: 8
<212> TYPE: PRT
<213> ORGANISM: Artificial sequence
<220> FEATURE:
<223> OTHER INFORMATION: CDR1 amino acid sequence of heavy chain of
      Pre-S2 antibody

<400> SEQUENCE: 10

Gly Tyr Thr Phe Thr Ser Tyr Trp
1               5

<210> SEQ ID NO 11
<211> LENGTH: 8
<212> TYPE: PRT
<213> ORGANISM: Artificial sequence
<220> FEATURE:
<223> OTHER INFORMATION: CDR2 amino acid sequence of heavy chain of
      Pre-S2 antibody

<400> SEQUENCE: 11

Ile Asn Pro Ser Asn Gly Ile Thr
1               5

<210> SEQ ID NO 12
<211> LENGTH: 15
<212> TYPE: PRT
<213> ORGANISM: Artificial sequence
<220> FEATURE:
<223> OTHER INFORMATION: CDR3 amino acid sequence of heavy chain of
      Pre-S2 antibody

<400> SEQUENCE: 12

Thr Ile Gly Tyr Asp Tyr Gly Ser Asn Tyr Glu Ala Met Asp Phe
1               5                   10                  15

<210> SEQ ID NO 13
<211> LENGTH: 11
<212> TYPE: PRT
<213> ORGANISM: Artificial sequence
<220> FEATURE:
<223> OTHER INFORMATION: CDR1 amino acid sequence of kappa light chain
      of Pre-S2 antibody

<400> SEQUENCE: 13

Lys Ser Leu Leu His Ser Asn Gly Ile Thr Tyr
1               5                   10

<210> SEQ ID NO 14
<211> LENGTH: 3
<212> TYPE: PRT
```

```
<213> ORGANISM: Artificial sequence
<220> FEATURE:
<223> OTHER INFORMATION: CDR2 amino acid sequence of kappa light chain
      of Pre-S2 antibody

<400> SEQUENCE: 14

Gln Met Ser
1

<210> SEQ ID NO 15
<211> LENGTH: 9
<212> TYPE: PRT
<213> ORGANISM: Artificial sequence
<220> FEATURE:
<223> OTHER INFORMATION: CDR3 amino acid sequence of kappa light chain
      of Pre-S2 antibody

<400> SEQUENCE: 15

Ala Gln Asn Leu Glu Leu Pro Trp Thr
1               5

<210> SEQ ID NO 16
<211> LENGTH: 10
<212> TYPE: PRT
<213> ORGANISM: Artificial sequence
<220> FEATURE:
<223> OTHER INFORMATION: CDR1 amino acid sequence of heavy chain of HBS
      antibody

<400> SEQUENCE: 16

Gly Tyr Thr Leu Thr Asp Tyr Val Ile Gly
1               5                   10

<210> SEQ ID NO 17
<211> LENGTH: 17
<212> TYPE: PRT
<213> ORGANISM: Artificial sequence
<220> FEATURE:
<223> OTHER INFORMATION: CDR2 amino acid sequence of heavy chain of HBS
      antibody

<400> SEQUENCE: 17

Glu Val Tyr Pro Gly Ser Val Tyr Thr Ser Tyr Asn Glu Lys Phe Lys
1               5                   10                  15

Gly

<210> SEQ ID NO 18
<211> LENGTH: 10
<212> TYPE: PRT
<213> ORGANISM: Artificial sequence
<220> FEATURE:
<223> OTHER INFORMATION: CDR3 amino acid sequence of heavy chain of HBS
      antibody

<400> SEQUENCE: 18

Ala Tyr Asp Gly Tyr Ser Pro Phe Asp Tyr
1               5                   10

<210> SEQ ID NO 19
<211> LENGTH: 11
<212> TYPE: PRT
<213> ORGANISM: Artificial sequence
<220> FEATURE:
<223> OTHER INFORMATION: CDR1 amino acid sequence of kappa light chain
      of HBS antibody
```

<400> SEQUENCE: 19

Lys Ala Ser Glu Asn Val Gly Thr Tyr Val Ser
1               5                   10

<210> SEQ ID NO 20
<211> LENGTH: 7
<212> TYPE: PRT
<213> ORGANISM: Artificial sequence
<220> FEATURE:
<223> OTHER INFORMATION: CDR2 amino acid sequence of kappa light chain
      of HBS antibody

<400> SEQUENCE: 20

Gly Ala Ser Asn Arg Tyr Ile
1               5

<210> SEQ ID NO 21
<211> LENGTH: 9
<212> TYPE: PRT
<213> ORGANISM: Artificial sequence
<220> FEATURE:
<223> OTHER INFORMATION: CDR3 amino acid sequence of kappa light chain
      of HBS antibody

<400> SEQUENCE: 21

Gly Gln Ser Tyr Asn Tyr Pro His Thr
1               5

<210> SEQ ID NO 22
<211> LENGTH: 117
<212> TYPE: PRT
<213> ORGANISM: Artificial sequence
<220> FEATURE:
<223> OTHER INFORMATION: Heavy chain amino acid sequence of Pre-S1
      antibody

<400> SEQUENCE: 22

Ser Asp Val Gln Leu Gln Glu Ser Gly Pro Gly Leu Val Lys Pro Ser
1               5                   10                  15

Gln Ser Leu Ser Leu Thr Cys Thr Val Thr Gly Tyr Ser Ile Thr Ser
            20                  25                  30

Asp Tyr Ala Trp Asn Trp Ile Arg Gln Phe Pro Gly Asn Lys Leu Glu
        35                  40                  45

Trp Met Gly Tyr Ile Arg Tyr Ser Gly Thr Thr Asn Tyr Asn Pro Ser
    50                  55                  60

Leu Lys Ser Arg Ile Ser Ile Thr Arg Asp Thr Ser Lys Asn Gln Phe
65                  70                  75                  80

Phe Leu Gln Leu Asn Ser Val Thr Thr Glu Asp Thr Ala Thr Tyr Tyr
                85                  90                  95

Cys Ala Arg Gly Gly Thr Gly Leu Thr Tyr Trp Gly Gln Gly Thr Leu
            100                 105                 110

Val Thr Val Ser Ala
        115

<210> SEQ ID NO 23
<211> LENGTH: 107
<212> TYPE: PRT
<213> ORGANISM: Artificial sequence
<220> FEATURE:
<223> OTHER INFORMATION: Kappa light chain amino acid sequence of Pre-S1
      antibody

<400> SEQUENCE: 23

Asn Ile Val Met Thr Gln Ser Pro Lys Ser Met Ser Met Ser Leu Gly
1               5                   10                  15

Glu Arg Val Thr Leu Thr Cys Lys Ala Ser Glu Asn Val Gly Thr Tyr
            20                  25                  30

Val Ser Trp Tyr Gln Gln Lys Pro Glu Gln Ser Pro Lys Leu Leu Ile
        35                  40                  45

Tyr Gly Ala Ser Asn Arg Asn Thr Gly Val Pro Asp Arg Phe Thr Gly
    50                  55                  60

Ser Gly Pro Ala Thr Asp Phe Thr Leu Thr Ile Ser Ser Val Gln Ala
65                  70                  75                  80

Glu Asp Leu Ala Asp Tyr Leu Cys Gly Gln Thr Tyr Asn Tyr Pro Phe
                85                  90                  95

Thr Phe Gly Ala Gly Thr Lys Leu Glu Leu Lys
            100                 105

<210> SEQ ID NO 24
<211> LENGTH: 122
<212> TYPE: PRT
<213> ORGANISM: Artificial sequence
<220> FEATURE:
<223> OTHER INFORMATION: Heavy chain amino acid sequence of Pre-S2
      antibody

<400> SEQUENCE: 24

Gln Val Gln Leu Gln Gln Pro Gly Thr Glu Leu Val Lys Pro Gly Thr
1               5                   10                  15

Ser Val Lys Leu Ser Cys Lys Ala Ser Gly Tyr Thr Phe Thr Ser Tyr
            20                  25                  30

Trp Met His Trp Val Lys Leu Arg Pro Gly Gln Gly Phe Glu Trp Ile
        35                  40                  45

Gly Glu Ile Asn Pro Ser Asn Gly Ile Thr Asn Tyr Asn Glu Lys Phe
    50                  55                  60

Lys Arg Lys Ala Thr Leu Thr Val Asp Lys Ser Ser Thr Thr Ala Tyr
65                  70                  75                  80

Met Gln Leu Ser Ser Leu Thr Phe Glu Asp Ser Ala Val Tyr Tyr Cys
                85                  90                  95

Thr Ile Gly Tyr Asp Tyr Gly Ser Asn Tyr Glu Ala Met Asp Phe Trp
            100                 105                 110

Gly Gln Gly Thr Ser Val Thr Val Ser Ser
        115                 120

<210> SEQ ID NO 25
<211> LENGTH: 112
<212> TYPE: PRT
<213> ORGANISM: Artificial sequence
<220> FEATURE:
<223> OTHER INFORMATION: Kappa light amino acid sequence of Pre-S2
      antibody

<400> SEQUENCE: 25

Asp Ile Val Met Thr Gln Ala Ala Phe Ser Asn Pro Val Thr Leu Gly
1               5                   10                  15

Thr Ser Ala Ser Met Ser Cys Arg Ser Ser Lys Ser Leu Leu His Ser
            20                  25                  30

Asn Gly Ile Thr Tyr Leu Tyr Trp Tyr Leu Gln Lys Pro Gly Gln Ser
        35                  40                  45

-continued

```
Pro Gln Leu Leu Ile Tyr Gln Met Ser Asn Leu Ala Ser Gly Val Pro
    50                  55                  60

Asp Arg Phe Ser Ser Gly Ser Gly Thr Asp Phe Thr Leu Arg Ile
65                  70                  75                  80

Ser Arg Val Glu Ala Glu Asp Val Gly Val Tyr Tyr Cys Ala Gln Asn
                85                  90                  95

Leu Glu Leu Pro Trp Thr Phe Gly Gly Gly Thr Lys Leu Glu Ile Lys
            100                 105                 110
```

<210> SEQ ID NO 26
<211> LENGTH: 116
<212> TYPE: PRT
<213> ORGANISM: Artificial sequence
<220> FEATURE:
<223> OTHER INFORMATION: Heavy chain amino acid sequence of HBS antibody

<400> SEQUENCE: 26

```
Val Gln Leu Gln Gln Ser Gly Pro Glu Leu Val Lys Pro Gly Ala Ser
1               5                   10                  15

Val Lys Met Ser Cys Lys Ala Ser Gly Tyr Thr Leu Thr Asp Tyr Val
                20                  25                  30

Ile Gly Trp Val Lys Gln Arg Thr Gly Gln Gly Leu Glu Trp Ile Gly
            35                  40                  45

Glu Val Tyr Pro Gly Ser Val Tyr Thr Ser Tyr Asn Glu Lys Phe Lys
    50                  55                  60

Gly Lys Ala Thr Leu Thr Ala Asp Lys Ser Ser Asn Thr Ala Tyr Met
65                  70                  75                  80

Gln Leu Ser Gly Leu Thr Ser Asp Ser Ala Val Tyr Phe Cys Ala
                85                  90                  95

Tyr Asp Gly Tyr Ser Pro Phe Asp Tyr Trp Gly Gln Gly Thr Thr Leu
            100                 105                 110

Thr Val Ser Ser
        115
```

<210> SEQ ID NO 27
<211> LENGTH: 108
<212> TYPE: PRT
<213> ORGANISM: Artificial sequence
<220> FEATURE:
<223> OTHER INFORMATION: Kappa light chain amino acid sequence of HBS
      antibody

<400> SEQUENCE: 27

```
Asn Ile Val Met Thr Gln Ser Pro Lys Ser Met Ser Met Ser Val Gly
1               5                   10                  15

Glu Arg Val Thr Leu Thr Cys Lys Ala Ser Glu Asn Val Gly Thr Tyr
                20                  25                  30

Val Ser Trp Phe Gln Gln Lys Pro Gly Gln Ser Pro Lys Leu Leu Ile
            35                  40                  45

Tyr Gly Ala Ser Asn Arg Tyr Ile Gly Val Pro Asp Arg Phe Thr Gly
    50                  55                  60

Ser Gly Ser Ala Thr Asp Phe Thr Leu Thr Ile Ser Ser Val Gln Ala
65                  70                  75                  80

Glu Asp Leu Ala Glu Tyr His Cys Gly Gln Ser Tyr Asn Tyr Pro His
                85                  90                  95

Thr Phe Gly Gly Gly Thr Lys Leu Val Ile Lys Arg
            100                 105
```

```
<210> SEQ ID NO 28
<211> LENGTH: 351
<212> TYPE: DNA
<213> ORGANISM: Artificial sequence
<220> FEATURE:
<223> OTHER INFORMATION: nucleotide sequence of heavy chain of Pre-S1
      antibody

<400> SEQUENCE: 28
tctgatgtgc agcttcagga gtcgggacct ggcctggtga aaccttctca gtctctgtcc     60
ctcacctgca ctgtcactgg ctactcaatc accagtgatt atgcctggaa ctggatccgg    120
cagtttccag gaaacaaact ggagtggatg ggctacatta ggtacagtgg taccactaac    180
tacaacccat ctctcaaaag tcgaatctct atcactcgag acacatccaa gaaccaattc    240
ttcctgcaat tgaattctgt gactactgag gacacagcca catattactg tgcaagaggg    300
gggacggggc ttacttactg gggccaaggg actctggtca ctgtctctgc a              351

<210> SEQ ID NO 29
<211> LENGTH: 321
<212> TYPE: DNA
<213> ORGANISM: Artificial sequence
<220> FEATURE:
<223> OTHER INFORMATION: nucleotide sequence of kappa light chain of
      Pre-S1 antibody

<400> SEQUENCE: 29
aacattgtta tgacccaatc tcccaaatcc atgtccatgt cactaggaga gagggtcacc     60
ttgacctgca aggccagtga gaatgtgggt acttatgtat cctggtatca acagaaacca    120
gaacagtctc ctaaactcct gatatacggg gcatccaacc ggaacactgg ggtccccgat    180
cgcttcacag gcagtggacc tgcaacagat ttcactctga ccatcagcag tgtgcaggct    240
gaagaccttg cagattatct ctgtggacag acttacaatt atccgttcac gttcggtgct    300
gggaccaagc tggagctgaa a                                               321

<210> SEQ ID NO 30
<211> LENGTH: 366
<212> TYPE: DNA
<213> ORGANISM: Artificial sequence
<220> FEATURE:
<223> OTHER INFORMATION: nucleotide sequence of heavy chain of Pre-S2
      antibody

<400> SEQUENCE: 30
caggtccaac tccagcagcc tgggactgaa ctggttaagc ctgggacttc agtgaagttg     60
tcctgcaagg cttctggcta caccttcacc agctactgga tgcactgggt gaagctgagg    120
cctggacaag gctttgagtg gattgggag  attaatccta gcaatggtat tactaactac    180
aatgagaagt tcaagagaaa ggccacactg actgtagaca atcctccac  cacagcctac    240 atgcaactca gcagcctgac atttgaggac tctgcggtct attactgtac aataggctat    300
gactacggta gtaactacga ggctatggac ttctggggtc aaggaacctc agtcaccgtc    360
tcctca                                                                366

<210> SEQ ID NO 31
<211> LENGTH: 336
<212> TYPE: DNA
<213> ORGANISM: Artificial sequence
<220> FEATURE:
<223> OTHER INFORMATION: nucleotide sequence of kappa light chain of
      Pre-S2 antibody
```

```
<400> SEQUENCE: 31
gatattgtga tgacgcaggc tgcattctcc aatccagtca ctcttggaac atcagcttcc    60
atgtcctgca ggtctagtaa gagtctccta catagtaatg gcatcactta tttgtattgg   120
tatcttcaga agccaggcca gtctcctcag ctcctgattt atcagatgtc caaccttgcc   180
tcaggagtcc cagacaggtt cagtagcggt gggtcaggaa ctgatttcac actgagaatc   240
agcagagtgg aggctgagga tgtgggtgtt tattactgtg ctcaaaattt agaacttccg   300
tggacgttcg gtggaggcac caagctggaa atcaaa                             336

<210> SEQ ID NO 32
<211> LENGTH: 348
<212> TYPE: DNA
<213> ORGANISM: Artificial sequence
<220> FEATURE:
<223> OTHER INFORMATION: nucleotide sequence of heavy chain of HBS
      antibody

<400> SEQUENCE: 32
gttcaactgc agcagtcagg acctgagctg gtgaagcctg gggcttcagt gaagatgtcc    60
tgcaaggctt ctggatacac actcactgac tatgttatag gatgggtgaa gcagagaact   120
ggacagggcc ttgagtggat tggagaggtt tatcctggaa gtgtttatac ttcctacaat   180
gagaagttca agggcaaggc cacactgact gcggacaaat cctccaacac agcctacatg   240
cagctcagcg gcctgacatc tgacgattct gcggtctatt tctgtgcata tgatggttac   300
tccccctttg actactgggg ccaaggcacc actctcacag tctcctca                348

<210> SEQ ID NO 33
<211> LENGTH: 324
<212> TYPE: DNA
<213> ORGANISM: Artificial sequence
<220> FEATURE:
<223> OTHER INFORMATION: nucleotide sequence of kappa light chain of HBS
      antibody

<400> SEQUENCE: 33
aacattgtaa tgacccaatc tcccaaatcc atgtccatgt cagtaggaga gcgggtcacc    60
ttgacctgca aggccagtga gaatgtgggt acttatgtat cctggtttca acagaaacca   120
gggcagtctc ctaaactgct gatatacggg gcatccaacc ggtatattgg ggtccccgat   180
cgcttcacag gcagtggatc tgcaacagat ttcactctga ccatcagcag tgtgcaggct   240
gaagaccttg cagaatatca ctgtggacag agttacaact atcctcacac gttcggaggg   300
gggaccaagc tggtaataaa acgg                                          324
```

KIT OF IN VITRO QUANTIFYING LARGE SURFACE PROTEIN OF HEPATITIS B VIRUS (HBV), BIOMARKER SET FOR ANALYZING PHASES OF HBV INFECTION AND HEPATOMA PROGNOSIS, AND SET OF MONOCLONAL ANTIBODIES FOR PREDICTING, DIAGNOSING OR TREATING CHRONIC LIVER DISEASE

RELATED APPLICATION

This application claims priority to U.S. Provisional Application Ser. No. 63/217,300, filed Jul. 1, 2021, which is herein incorporated by reference in its entirety.

BACKGROUND

A sequence listing is being submitted herein as an ASCII text file with the name "SP-5407-US_SEQ_LIST(ASCII)", created on Jun. 28, 2022, with a file size of 14,976 bytes.

FIELD OF INVENTION

The present invention relates to a kit and a method of detecting hepatitis B virus infection in different phases. More specifically, the present invention relates to a kit of in vitro quantifying large surface protein of hepatitis B virus (LHBS), a biomarker set for analyzing phases of HBV infection and hepatoma prognosis, and a set of monoclonal antibodies for predicting, diagnosing or treating a chronic liver disease via those biomarkers in a subject in need thereof.

DESCRIPTION OF RELATED ART

Chronic hepatitis B (CHB) virus infection is a major cause of HCC worldwide and is the most important cause in Asia. Early diagnosis and effective treatment of HBV infection is very important for preventing advanced liver diseases. Though the viral DNA titer is a sensitive early biomarker for anti-viral therapeutic efficacies, the experimental procedures for its detection require DNA extraction and real-time polymerase chain reaction, which are relatively time consuming and costly. Development of new biomarkers that can detect the early change of viral reproduction and predict the anti-viral therapeutic efficacies is very important.

Recently, the large HBV surface (LHBS) protein is a very important marker for HBV life cycle. LHBS contains the pre-S1, pre-S2 and S domains of the surface protein and is an integral component of the virion envelope. Since the correlation of serum LHBS and HBV DNA copy number was very high, it is a reasonable assumption that the serum LHBS level can potentially serve as a biomarker for viral replication as HBV DNA. Due to that detection of serum LHBS is much more time- and cost-effective than that of HBV DNA. Accordingly, there is an urgent need to develop LHBS-related biomarkers for increasing sensitivity and dynamic breadth of detecting LHBS as well as analyzing phases of hepatitis B virus infection.

SUMMARY

The invention provides a kit of in vitro quantifying large surface protein of hepatitis B virus (LHBS) in a biological sample, which includes a set of monoclonal antibodies having respective binding specificity for specific regions of LHBS, so as to increase sensitivity and dynamic breadth of detecting LHBS.

Moreover, the invention also provides a biomarker set for analyzing phases of HBV infection and hepatoma prognosis in a biological sample, in which the biomarker set includes biomarkers having specific region of LHBS, respectively.

Furthermore, the invention also provides a set of monoclonal antibodies for predicting, diagnosing or treating a chronic liver disease via biomarkers in a subject in need thereof.

According to the aforementioned aspect, the invention provides a kit of in vitro quantifying large surface protein of hepatitis B virus (LHBS) in a biological sample. In an embodiment, the kit can include a blocking solution; a set of monoclonal antibodies for detecting biomarkers in the biological sample, which includes a first monoclonal antibody immobilized in multiple discrete locations on a solid support and immersed in the blocking solution; at least one of a second monoclonal antibody and a third monoclonal antibody respectively linked to the label; and a detection reagent capable of reacting with the label and forming a detectable product.

In the aforementioned embodiment, the first monoclonal antibody has a binding specificity for a first polypeptide listed as SEQ ID NO: 1 in a biological sample, the second monoclonal antibody has a binding specificity for a second polypeptide listed as SEQ ID NO: 2 in the biological sample, and the third monoclonal antibody has a binding specificity for a third polypeptide listed as SEQ ID NO: 3 in the biological sample.

According to another aspect, the invention provides a biomarker set for analyzing phases of HBV infection and hepatoma prognosis in a biological sample, which can include a first biomarker having a first polypeptide of SEQ ID NO: 1, a second biomarker having a second polypeptide of SEQ ID NO: 2 and/or a third biomarker having a third polypeptide of SEQ ID NO: 3.

According to a further aspect, the invention provides a set of monoclonal antibodies for predicting, diagnosing or treating a chronic liver disease via biomarkers in a subject in need thereof. In an embodiment, the set of the monoclonal antibodies can include a first monoclonal antibody or a first antigen-binding fragment thereof, and at least one of a second monoclonal antibody or a second antigen-binding fragment thereof and a third monoclonal antibody or a third antigen-binding fragment thereof. The first monoclonal antibody can specifically detect a first biomarker having a first polypeptide of SEQ ID NO: 1, and the first monoclonal antibody or the first antigen-binding fragment thereof comprises heavy chain CDR 1 to 3 sequences consisting of SEQ ID NOs: 4 to 6 and light chain CDR 1 to 3 sequences consisting of SEQ ID NOs: 7 to 9. The second monoclonal antibody or the second antigen-binding fragment thereof can specifically detect a second biomarker having a second polypeptide of SEQ ID NO: 2, and the second monoclonal antibody or the second antigen-binding fragment thereof comprises heavy chain CDR 1 to 3 sequences consisting of SEQ ID NOs: 10 to 12 and light chain CDR 1 to 3 sequences consisting of SEQ ID NOs: 13 to 15. The third monoclonal antibody or the third antigen-binding fragment thereof can specifically detect a third biomarker having a third polypeptide of SEQ ID NO: 3, and the third monoclonal antibody or the third antigen-binding fragment thereof comprises heavy chain CDR 1 to 3 sequences consisting of the sequences listed as SEQ ID NOs: 16 to 18 and light chain CDR 1 to 3 sequences consisting of the sequences listed as SEQ ID NOs: 19 to 21.

In the aforementioned embodiment, the biomarkers comprise a first biomarker having the first polypeptide of SEQ ID NO: 1, a second biomarker having the second polypeptide of SEQ ID NO: 2, and a third biomarker having the third polypeptide of SEQ ID NO: 3.

In the aforementioned embodiment, the first monoclonal antibody or the first antigen-binding fragment thereof comprises a heavy chain sequence listed as SEQ ID NO: 22 and a light chain sequence listed as SEQ ID NO: 23.

In the aforementioned embodiment, the second monoclonal antibody or the second antigen-binding fragment thereof comprises a heavy chain sequence listed as SEQ ID NO: 24 and a light chain sequence listed as SEQ ID NO: 25.

In the aforementioned embodiment, the third monoclonal antibody or the third antigen-binding fragment thereof comprises a heavy chain sequence listed as SEQ ID NO: 26 and a light chain sequence listed as SEQ ID NO: 27.

In the aforementioned embodiment, the first monoclonal antibody comprises the heavy chain encoded by a sequence listed as SEQ ID NO: 28 and the light chain encoded by a sequence listed as SEQ ID NO: 29.

In the aforementioned embodiment, the second monoclonal antibody comprises the heavy chain encoded by a sequence listed as SEQ ID NO: 30 and the light chain encoded by a sequence listed as SEQ ID NO: 31.

In the aforementioned embodiment, the third monoclonal antibody comprises the heavy chain encoded by a sequence listed as SEQ ID NO: 32 and the light chain encoded by a sequence listed as SEQ ID NO: 33.

In the aforementioned embodiment, the first monoclonal antibody or the first antigen-binding fragment thereof, the second monoclonal antibody or the second antigen-binding fragment thereof, and the third monoclonal antibody or the third antigen-binding fragment thereof, are antigen binding domains of chimeric antigen receptors (CARs) of engineered T cells.

In the aforementioned embodiment, the first monoclonal antibody or the first antigen-binding fragment thereof, the second monoclonal antibody or the second antigen-binding fragment thereof, and the third monoclonal antibody or the third antigen-binding fragment thereof, are antigen binding domains of antibody-drug conjugates (ADCs).

With application to the kit of quantifying LHBS in the biological sample, the biomarker set for analyzing phases of hepatitis B virus infection and hepatoma prognosis, and the set of monoclonal antibodies for predicting, diagnosing or treating chronic liver disease, in which the antibodies have respective binding specificity for specific region of LHBS, leading in increase of sensitivity and dynamic breadth of detecting LHBS, analysis of phases of HBV infection and hepatoma prognosis in a biological sample, as well as development of antigen binding domains of chimeric antigen receptors (CARs) of engineered T cells and antibody-drug conjugates (ADCs).

It is to be understood that both the foregoing general description and the following detailed description are by examples, and are intended to provide further explanation of the invention as claimed.

BRIEF DESCRIPTION OF THE DRAWINGS

The patent or application file contains at least one drawing executed in color. Copies of this patent or patent application publication with color drawings will be provided by Office upon request and payment of the necessary fee. The disclosure can be more fully understood by reading the following detailed description of the embodiment, with reference made to the accompanying drawings as follows.

DETAILED DESCRIPTION

Figure 1:
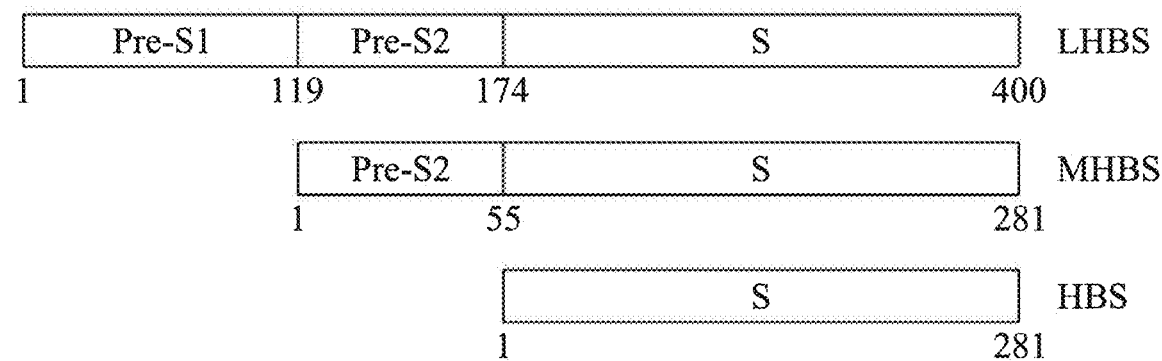
FIG. 1 illustrates a schematic diagram of the large (L) HBS, medium (M) HBS, and HBS proteins.

Reference will now be made in detail to the present embodiments of the invention, examples of which are illustrated in the accompanying drawings. Wherever possible, the same reference numbers are used in the drawings and the description to refer to the same or like parts.

As aforementioned, the present invention provides a kit and an immunoassay of in vitro quantifying LHBS, in which the kit and the immunoassay includes monoclonal antibodies having respective binding specificity for specific regions of LHBS, thereby increasing sensitivity and dynamic breadth of detecting LHBS in a biological sample.

It had been found that continuous positive LHBS in the patients' sera were able to predict HBV DNA conversion, even if they continued to receive the antiviral treatments.

Quantitative measurement of LHBS could potentially replace the time and cost-consuming real-time PCR detection of HBV DNA quantification.

Generally, the "monoclonal antibodies" having respective binding specificity for specific regions of LHBS" as discussed hereinafter can include but not be limited to a first monoclonal antibody having a binding specificity for a first polypeptide of SEQ ID NO: 1, a second monoclonal antibody having a binding specificity for a second polypeptide of SEQ ID NO: 2, and a third monoclonal antibody having a binding specificity for a third polypeptide of SEQ ID NO: 3.

Typically, the first monoclonal antibody or the antigen-binding fragment thereof having a binding specificity for the first polypeptide of SEQ ID NO: 1 or a capture antibody corresponds to a pre-S1 region of LHBS. In an embodiment, the first monoclonal antibody can be immobilized onto a surface, for specifically capturing a pre-S1 region of LHBS proteins in a biological sample. In some examples, the biological sample can include but be not limited to a tissue and/or a fluid sample. In some examples, the tissue can include a solid tissue and/or a soft tissue. In certain examples, the fluid sample can include serum, blood, urine, semen, CSF and saliva.

In some embodiments, the first monoclonal antibody or antigen-binding fragment thereof can include a heavy chain CDR sequence selected from the group consisting of the sequences listed as SEQ ID NOs: 4 to 6, and a light chain CDR sequence selected from the group consisting of the sequences listed as SEQ ID NOs: 7 to 9. In other embodiments, the first monoclonal antibody or antigen-binding fragment thereof can include a heavy chain sequence listed as SEQ ID NO: 22, and a light chain sequence listed as SEQ ID NO: 23. In certain embodiments, the first monoclonal antibody or antigen-binding fragment thereof can include a heavy chain sequence encoded by a sequence listed as SEQ ID NO: 28, and a light chain sequence encoded by a sequence listed as SEQ ID NO: 29.

Typically, the second monoclonal antibody or the antigen-binding fragment thereof having a binding specificity for the second polypeptide of SEQ ID NO: 2 or a detection antibody corresponds to a Pre-S2 region of LHBS. The second monoclonal antibody or the detection antibody can be designed to capture pre-S2 region of LHBS proteins or immunocomplexes thereof in a reaction mixture, for significantly broadening a dynamic range of detecting LHBS.

In some embodiments, the second monoclonal antibody or antigen-binding fragment thereof can include a heavy chain CDR sequence selected from the group consisting of the sequences listed as SEQ ID NOs: 10 to 12, and a light chain CDR sequence selected from the group consisting of the sequences listed as SEQ ID NOs: 13 to 15. In other embodiments, the second monoclonal antibody or antigen-binding fragment thereof can include a heavy chain sequence listed as SEQ ID NO: 24, and a light chain sequence listed as SEQ ID NO: 25. In certain embodiments, the second monoclonal antibody or antigen-binding fragment thereof can include a heavy chain sequence encoded by a sequence listed as SEQ ID NO: 30, and a light chain sequence encoded by a sequence listed as SEQ ID NO: 31.

Typically, the third monoclonal antibody or the antigen-binding fragment thereof having a binding specificity for the third polypeptide of SEQ ID NO: 3 or another detection antibody corresponds to a S region of LHBS. The third monoclonal antibody or another detection antibody can be designed to capture S region of LHBS proteins or immunocomplexes thereof in a reaction mixture, for significantly broadening a dynamic range of detecting LHBS.

Both of the second and the third monoclonal antibodies can be designed to detect the Pre-S2 and the S regions of the LHBS protein, for increasing dynamic breadth of detecting LHBS. In an embodiment, the second monoclonal antibody and the third monoclonal antibody can be linked to a label, respectively, for subsequently reacting with a reporting substrate.

It should be noted that, the monoclonal antibodies can be chimerized or humanized for different applications. In addition, if the first monoclonal antibody was not responsible for the capture of pre-S1 region of LHBS proteins in a biological sample, it would be hardly to achieve the desired sensitivity and dynamic breadth of detecting LHBS.

The aforementioned monoclonal antibodies can be applied to a kit and an immunoassay of in vitro quantifying LHBS. In some embodiments, the kit can include a blocking solution. The first monoclonal antibody can be immobilized in multiple discrete locations on a solid support and immersed partially in the blocking solution. The second monoclonal antibody linked to a label, a third monoclonal antibody linked to the label, and a detection reagent capable of reacting with the label and forming a detectable product.

In some embodiments, the immunoassay of in vitro quantifying LHBS can be carried out as follow. Firstly, a first monoclonal antibody is immobilized onto a surface and immersed in a blocking solution. Next, a biological sample solution reacts with the first monoclonal antibody to form a first immunocomplex. And then, a second monoclonal antibody and a third monoclonal antibody react with the first immunocomplex to form a second immunocomplex. Subsequently, a detection reagent reacts with the label, so as to form a detectable product. Afterwards, the detectable product is quantified, in which a dynamic range of the LHBS can be ranged in 1.7 ng/mL to 108.5 ng/mL.

In some embodiment, an analytical sensitivity of the LHBS in the immunoassay is no greater than 0.1 ng/mL.

In some embodiments, it is not intended to limit the aforementioned surface, the blocking solution, the detection reagent, the label and the detectable product.

In some examples, the aforementioned surface can be a solid surface suitable for the attachment of monoclonal antibodies. Examples of the solid surface can include but be not limited to a particle (including, but not limited to an agarose or latex bead or particle or a magnetic particle), a bead, a nanoparticle, a polymer, a substrate, a slide, a coverslip, a plate, a dish, a well, a membrane and/or a grating. The solid surface can include many different materials including, but not limited to, polymers, plastics, resins, polysaccharides, silicon or silica based materials, carbon, metals, inorganic glasses and membranes.

In some examples, the aforementioned blocking solution and the detection reagent can be commonly used buffer or commercially available ones rather than reciting them in detail.

The "label" discussed hereinafter refers to a molecule or moiety that can be detected, e.g. measured and/or determined to be present or absent by spectroscopic, photochemical, biochemical, immunochemical, electromagnetic, radiochemical, or chemical means, such as fluorescence, chemifluoresence, or chemiluminescence, or any other appropriate means. Such labels can comprise, for example, a light-absorbing dye, a fluorescent dye, or a radioactive label. The labels, methods of detecting them, and methods of incorporating them into reagents (e.g. antibodies and nucleic acid probes) are well known in the art.

The label used in the methods described herein can be a primary label (where the label comprises a moiety that is directly detectable or that produces a directly detectable moiety) or a secondary label (where the detectable label binds to another moiety to produce a detectable signal, e.g., as is common in immunological labeling using secondary and tertiary antibodies). The label can be linked by covalent or non-covalent means to the reagent. Alternatively, a label can be linked such as by directly labeling a molecule that achieves binding to the reagent via a ligand receptor binding pair arrangement or other such specific recognition molecules. The label can include but be not limited to radioisotopes, bioluminescent compounds, chromophores, antibodies, chemiluminescent compounds, fluorescent compounds, metal chelates, and enzymes.

In some embodiments, a label can be an enzyme including, but not limited to horseradish peroxidase and alkaline phosphatase. An enzymatic label can produce a detectable product, for example, a chemiluminescent signal, a color signal, or a fluorescent signal. Enzymes contemplated for use as a label can include, but are not limited to, malate dehydrogenase, staphylococcal nuclease, delta-V-steroid isomerase, yeast alcohol dehydrogenase, alpha-glycerophosphate dehydrogenase, triose phosphate isomerase, horseradish peroxidase, alkaline phosphatase, asparaginase, glucose oxidase, beta-galactosidase, ribonuclease, urease, catalase, glucose VI-phosphate dehydrogenase, glucoamylase and acetylcholinesterase.

In some embodiments, commercially available detection systems can also be used, for example, a biotin-streptavidin system. In this system, the antibodies immunoreactive (i.e. specific for) with the biomarker of interest is biotinylated. Quantity of biotinylated antibody bound to the biomarker is determined using a streptavidin-peroxidase conjugate and a chromogenic substrate.

Typically, the "biomarker" as discussed hereinafter can include but be not limited to a single biomarker or a biomarker set including a plurality of biomarkers. In an example, the biomarker can include but be not limited to a first biomarker having a first polypeptide of SEQ ID NO: 1, a second biomarker having a second polypeptide of SEQ ID NO: 2 and/or a third biomarker having a third polypeptide of SEQ ID NO: 3. In other examples, a biomarker set can include but be not limited to the first biomarker, and at least one of the second biomarker and the third biomarker.

In practice, the aforementioned biomarker or the biomarker set can be applied on non-invasively analyzing HBV infection phases and hepatoma prognosis in a biological sample, or predicting or diagnosing a severity of a chronic liver disease in a biological sample.

In other applications, a monoclonal antibody for detecting the aforementioned biomarker, or a set of monoclonal antibodies for detecting the aforementioned biomarker set can be applied on predicting, diagnosing or treating a chronic liver disease via biomarkers in a subject in need thereof. In these examples, the monoclonal antibody or the set of monoclonal antibodies can include the first, the second and/or the third monoclonal antibodies or antigen-binding fragments thereof.

Adoptive chimeric antigen receptor T cell (CAR-T) immunotherapy has been implicated to improve tumor targeting efficacies. The modulated T cell that expresses genetically engineered CAR-construct, which contains immunoglobulin single-chain variable (ScFv) fragment to recognize the tumor antigens, can attack target cells without priming by antigen presentation. The T cells can be engineered by employing the vectors expressing the ScFv targeting the HCC-associated antigens such as the HBV LHBS protein. In some examples, the first monoclonal antibody or the first antigen-binding fragment thereof, the second monoclonal antibody or the second antigen-binding fragment thereof, and the third monoclonal antibody or the third antigen-binding fragment thereof, can be antigen binding domains of chimeric antigen receptors (CARs) of engineered T cells. In other examples, the first monoclonal antibody or the first antigen-binding fragment thereof, the second monoclonal antibody or the second antigen-binding fragment thereof, and the third monoclonal antibody or the third antigen-binding fragment thereof, can be antigen binding domains of antibody-drug conjugates (ADCs).

Thereinafter, it will be understood that particular configurations, aspects, examples, clauses and embodiments described hereinafter are shown by way of illustration and not as limitations of the invention. The principal features of this invention can be employed in various embodiments without departing from the scope of the invention. Thus, one skilled in the art can easily ascertain the essential characteristics of the present invention and, without departing from the spirit and scope thereof, can make various changes and modifications of the invention to adapt it to various usages and conditions.

Example 1: Characterization of Monoclonal Antibodies 1.1 Patient Groups

In this example, forty-nine HBV carriers under medications and follow up in National Cheng Kung University (NCKU) Hospital (Tainan, Taiwan) from year 2010 to 2017 were recruited to this Example with informed consent. Sera of these patients were tested for various HBV biomarkers including HBsAg, DNA titers and LHBS, developed in this Example, were performed. The HBV infection phases of the patients were determined based on the European Association for the Study of the Liver (EASL) 2017 Clinical Practice Guidelines (EASL 2017) (*J. Hepatol.* 67(2):370-398, 2017 August).

1.2 Antigen Preparation for Mouse Immunization

In this example, to generate mouse antibodies specifically recognizing pre-S region of the HBV LHBS, the pre-S region gene was cloned into pET21b plasmid vector and induced to express in *E. coli* BL21 strain using the inducing chemical isopropyl β-D-1-thiogalactopyranoside (IPTG, 0.2 mM). The purified recombinant pre-S region protein was injected into BALB/c mice to generate the pre-S region antibodies. To generate antibodies that recognize HBS, the HBS recombinant protein, purchased from Leadgene, Inc. (Taiwan), was injected to mice for generating the HBS-specific antibodies (FIG. 1). The mouse whose serum showed the highest affinities to the HBS was selected for further investigation.

1.3 Screening and Purification of Monoclonal Antibodies

In this example, mice injected with the recombinant proteins indicated in the previous section were sacrificed. The splenocytes were subjected to hybridoma preparation. Culture media of the hybridomas containing antibodies were examined for antibody titers using ELISA for the pre-S region and HBS proteins. The hybridoma cells that expressed antibodies recognizing target proteins were further subjected to serial limiting dilution procedures to generate monoclonal antibody hybridoma clones. The monoclonal antibodies were tested for their sensitivities/specificities recognizing LHBS, HBS, and pre-S1 region peptides spanning amino acid 21 to 47, the region previously reported to be highly antigenic. The hybridoma clones which presented with satisfactory sensitivities and specificities to the target proteins were purified and intraperitoneally injected into mice for ascites production. Finally, the ascites that were rich in antibodies were harvested and the monoclonal antibodies were purified using the IgG beads. Some aliquots of these antibodies were also directly conjugated with biotin as they were evaluated as detection antibodies in the sandwich ELISA system.

1.4 Antigen Recognition Regions of Monoclonal Antibodies

Figure 2A:
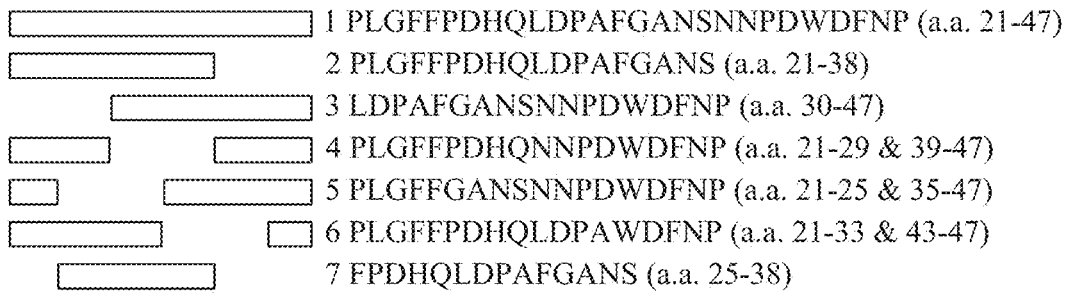
FIGS. 2A to 2C illustrate binding affinities of the pre-S1 monoclonal antibody (FIG. 2A), pre-S2 monoclonal antibody (FIG. 2B) and HBS monoclonal antibody (FIG. 2C) against the various regions of LHBS according to embodiments of the present invention.
Figure 2A:
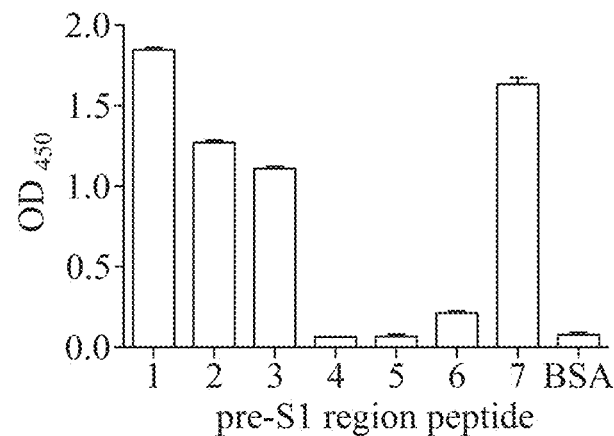
Figure 2B:
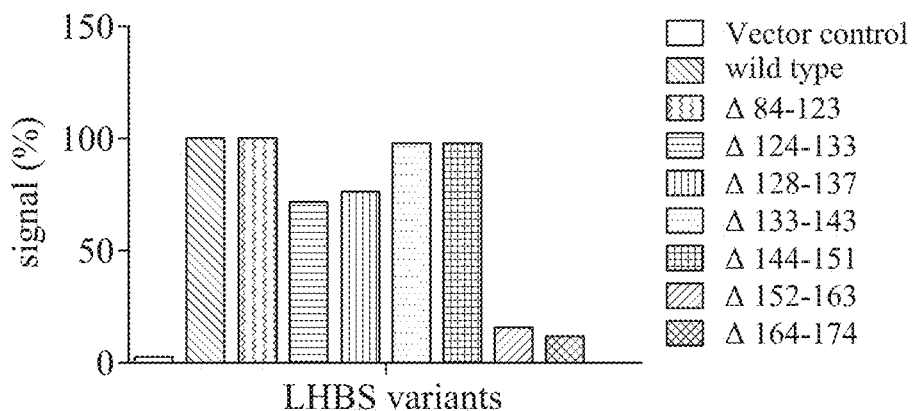
Figures 2C, 2D:
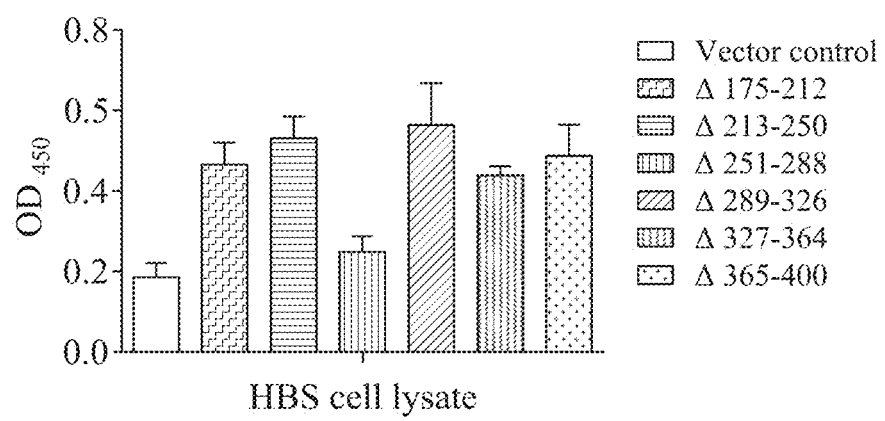
FIG. 2D illustrates a schematic diagram of the recognition regions of the pre-S1, pre-S2 and HBS monoclonal antibodies against the LHBS according to embodiments of the present invention.

The monoclonal antibodies generated in this Example were analyzed for the antigen recognition regions. Reference was made to FIGS. 2A to 2C, which illustrated binding affinities of the pre-S1 monoclonal antibody (FIG. 2A), pre-S2 monoclonal antibody (FIG. 2B) and HBS monoclonal antibody (FIG. 2C) against the various regions of LHBS according to embodiments of the present invention.

As shown in FIG. 2A, for the pre-S1 region antibody, various oligopeptides spanning the pre-S1 N-terminal amino acid 21 to 47 region (i.e., $1^{st}$ to $7^{th}$ amino acid residue of pre-S1 region peptides), previously shown to be highly antigenic, were synthesized and detected for their relative affinities to the pre-S1 antibody. The results indicated that the pre-S1 antibody specifically recognized the peptide containing the amino acid 25-38 in the sequence FPDHQLDPAFGANS (SEQ ID NO: 1), as compared with the adjacent protein regions.

As for the pre-S2 region antibody, cell lysates of the 293T cells transfected with the LHBS gene partially deleted of various pre-S regions were tested for their recognition by the antibody by ELISA. The results of FIG. 2B showed that the pre-S2 antibody recognized the full-length and various truncated LHBS constructs except the one deleted of the a. a. residues 152-163 and 164-174 in the pre-S2 region, indicating that the epitope for the pre-S2 monoclonal antibody was likely located around a. a. 152-174 in the pre-S2 region (SEQ ID NO: 2).

In the case of the HBS antibody shown in FIG. 2C, the antibody recognized the all LHBS truncation proteins except that deleted of a. a. 251-288 (SEQ ID NO: 3), which was suggested to be the HBS antibody recognition region.

Reference was made to FIG. 2D, which illustrated a schematic diagram of the recognition regions of the pre-S1, pre-S2 and HBS monoclonal antibodies against the LHBS according to the aforementioned embodiments of the present invention.

1.5 DNA Sequencing of the Antibody Variable Genes

DNA sequencing of the antibody variable (V) genes in the pre-S1, pre-S2, and HBS antibody-producing hybridoma cell lines was performed by Leadgene, Inc. (Tainan, Taiwan). Antibody monoclonality in each cell line was confirmed and the DNA sequences of the framework region (FR) and the complementary determining region (CDR) in the antibody V genes were demonstrated. The corresponding amino acid residues in these regions were determined based on the DNA sequences.

The amino acid sequences of the heavy chain and the light chain of the pre-S1 antibody were listed as SEQ ID NO: 22 (heavy chain) and SEQ ID NO: 23 (kappa light chain), the respective CDR 1 to 3 were listed as SEQ ID NOs: 4 to 6 (heavy chain) and SEQ ID NOs: 7 to 9 (kappa light chain), and the respective DNA sequences of which were listed as SEQ ID NO: 28 (heavy chain) and SEQ ID NO: 29 (kappa light chain).

The amino acid sequences of the heavy chain and the light chain of the pre-S2 antibody were listed as SEQ ID NO: 24 (heavy chain) and SEQ ID NO: 25 (kappa light chain), the respective CDR 1 to 3 were listed as SEQ ID NOs: 10 to 12 (heavy chain) and SEQ ID NOs: 13 to 15 (kappa light chain), and the respective DNA sequences of which were listed as SEQ ID NO: 30 (heavy chain) and SEQ ID NO: 31 (kappa light chain).

The amino acid sequences of the heavy chain and the light chain of the HBS antibody were listed as SEQ ID NO: 26 (heavy chain) and SEQ ID NO: 27 (kappa light chain), the respective CDR 1 to 3 were listed as SEQ ID NOs: 16 to 18 (heavy chain) and SEQ ID NOs: 19 to 21 (kappa light chain), and the respective DNA sequences of which were listed as SEQ ID NO: 32 (heavy chain) and SEQ ID NO: 33 (kappa light chain).

Example 2: Characterization of Monoclonal Antibodies 2.1 Determination of Antibody Sensitivities To determine the antibody titers, 0.1 ng/μL of each antigen protein or peptide was coated onto each well of the 96-well ELISA plate then incubated at 4° C. overnight. On the next day, the purified monoclonal antibodies were serially 10-fold diluted and added onto the ELISA wells pre-coated with antigens, followed with the standard ELISA washing steps with phosphate buffered saline with Tween® 20 (PBST, pH7.4). The antigen-antibody complex signals were detected using the anti-mouse IgG secondary antibodies conjugated with the horse radish peroxidase (HRP) enzyme, followed with the chemiluminescent HRP substrate tetramethylbenzidine (TMB) and the signals were measured using an ELISA chemiluminescence reader.

Also, to determine the antigen detection limits of the antibodies, the various antigen proteins were serially 10-fold diluted then coated onto the ELISA wells, which were then added with antibodies (1:2000 dilution in PBST), followed with the standard chemiluminescence detection procedures. The calibration curves were plotted to determine limit of detection (LOD), limit of quantification (LOQ), linear range, and limit of linearity (LOL) of the various antibodies for their specific antigen proteins (Armbruster & Pry, *Clin. Biochem. Rev.* Vol. 29, Suppl(i)., 2008).

In this example, the mouse monoclonal antibodies of the pre-S1, the pre-S2, and the HBS antibodies were tested for their sensitivities to the recombinant target proteins.

Figure 3A:
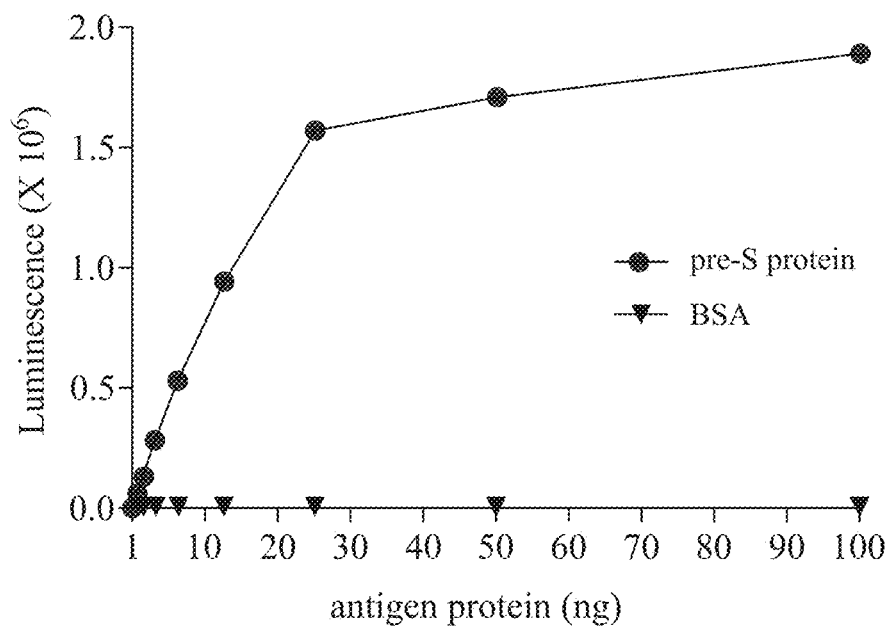
FIGS. 3A to 3C illustrate line graphs showing detection sensitivities and dynamic ranges of the pre-S1 monoclonal antibody (FIG. 3A), pre-S2 monoclonal antibody (FIG. 3B) and HBS monoclonal antibody (FIG. 3C) against the respective recombinant protein according to embodiments of the present invention.
Figure 3B:
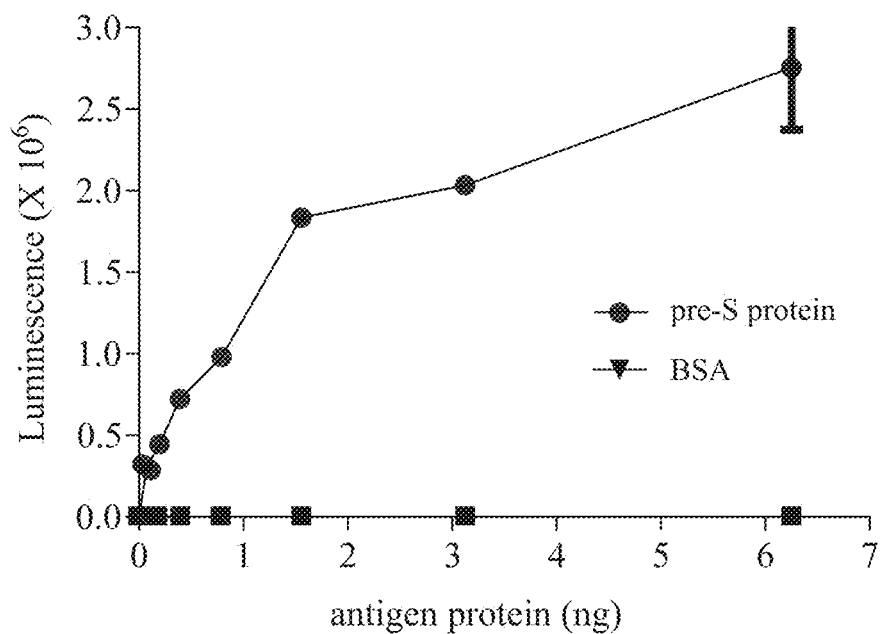
Figure 3C:
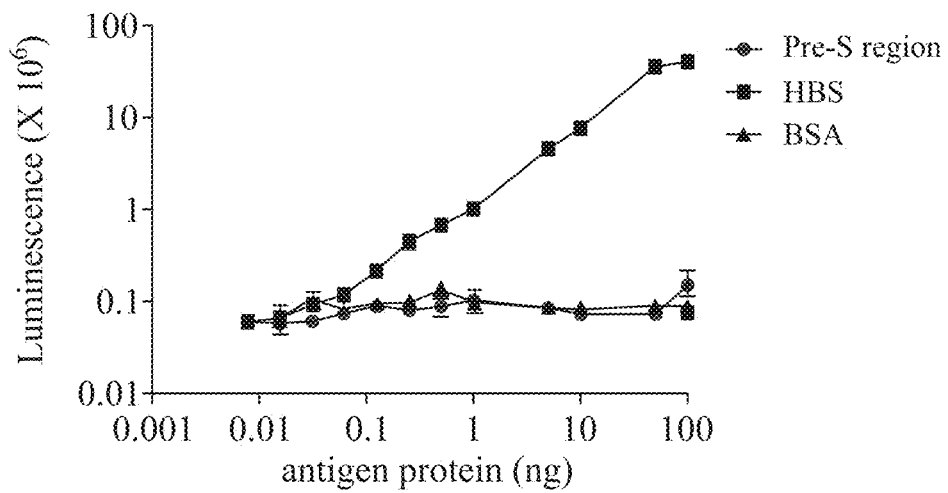

Reference was made to FIGS. 3A to 3C, which illustrated line graphs showing detection sensitivities and dynamic ranges of the pre-S1 monoclonal antibody (FIG. 3A), pre-S2 monoclonal antibody (FIG. 3B) and HBS monoclonal antibody (FIG. 3C) against the respective recombinant protein according to embodiments of the present invention.

The results shown in FIGS. 3A and B indicated that the pre-S1 and pre-S2 antibodies recognized the pre-S region *E. coli* recombinant protein well.

As shown in FIG. 3A, for the pre-S1 antibody, the limit of quantification (LOQ) and limit of linearity (LOL) values were 0.09 and 12.5 ng/mL, respectively, indicating that the detection dynamic range is 0.09 to 12.5 ng/mL.

As shown in FIG. 3B, the pre-S2 antibody also showed high sensitivity to the pre-S region protein with the LOQ and LOL values 0.04 and 1.56 ng/mL, respectively.

As for the HBS antibody shown in FIG. 3C, the LOQ and LOL were 0.06 and 50 ng/mL, respectively, for the HBS recombinant protein. As these monoclonal antibodies presented with satisfactory sensitivities and specificities to their target proteins, they were large-scale amplified by ascites production then purified by IgG columns and conjugated with biotin for sandwich assays.

2.2 Detection of LHBS in Serum by ELISA

The monoclonal antibodies generated in this Example were employed to construct a sandwich ELISA system to detect LHBS in serum. The LHBS-specific antibody, which targets the pre-S1 region, was coated onto the ELISA wells then incubated at 4° C. overnight. On the next day, the wells were added with standard normal or the HBsAg (+) serum (5 μL serum+98 μL 2% bovine serum albumin/well). After serial washing steps, the detection antibodies, which recognized the pre-S2 or HBS regions, were added. The LHBS signals were finally visualized by chemiluminescence detection. The level of LHBS in the serum was quantified by plotting the signal value to a standard curve generated using the pre-S region recombinant protein in various concentrations.

Figure 4A:
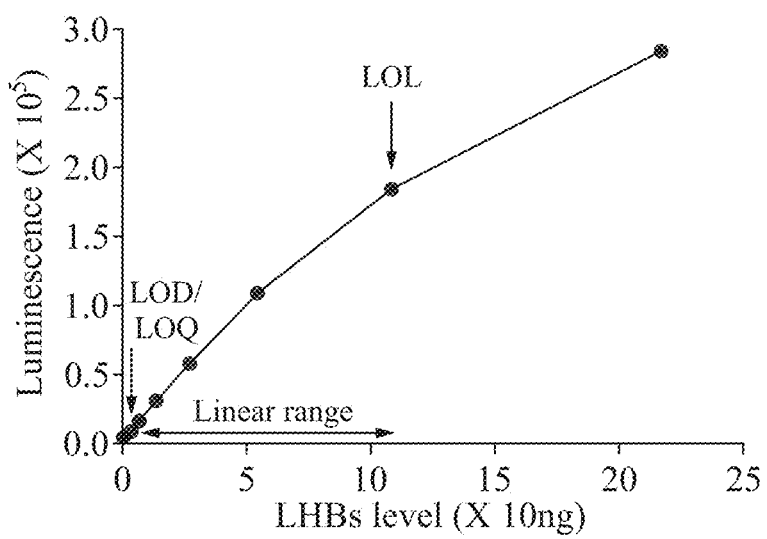
FIGS. 4A to 4B illustrate line graphs showing detection sensitivities and dynamic ranges of the LHBS chemiluminescent sandwich ELISA system in serum using the pre-S2 monoclonal antibody (FIG. 4A) or HBS monoclonal antibody (FIG. 4B) as detection antibody according to embodiments of the present invention.
Figure 4B:
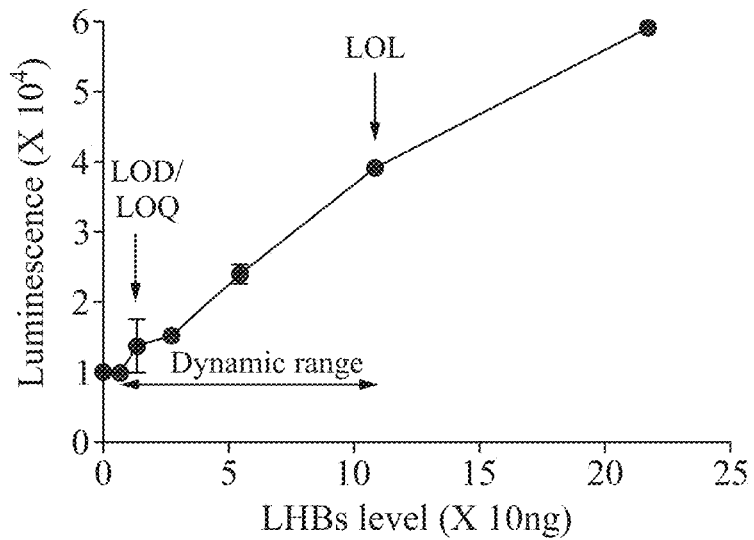

Reference was made to FIGS. 4A to 4B, which illustrated line graphs showing detection sensitivities and dynamic ranges of the LHBS chemiluminescent sandwich ELISA system in serum using the pre-S2 monoclonal antibody (FIG. 4A) or HBS monoclonal antibody (FIG. 4B) as detection antibody according to embodiments of the present invention.

The pre-S1 antibody, which specifically recognized LHBS, was used as the coating antibody, whereas either the pre-S2 or HBS antibody was used as the detection antibody in the LHBS ELISA system. Pooled sera of the HBsAg(+) cases with the known concentration of LHBS were tested in the ELISA analysis. The results show that, the LHBS sandwich ELISA assay with the pre-S2 detection antibody revealed the LOQ value with 13.5 ng/mL, and the linearity range was 13.5 to 108.5 ng/mL (FIG. 4A; platform 1). Whereas, the ELISA with the HBS detection antibody revealed the LOQ value with 1.7 ng/mL, and the linearity range was 1.7 to 108.5 ng/mL (FIG. 4B; platform 2). These data demonstrated that the LHBS sandwich ELISA system using either the pre-S2 or HBS detection antibody could sensitively detect LHBS in serum.

Example 3: Sandwich ELISA for LHBS Detection in Various HBV Infection Phases To find the correlation of LHBS levels with HBV infection phases, sera of forty-nine cases in various HBV infection phases were recruited to this Example.

Figure 5:
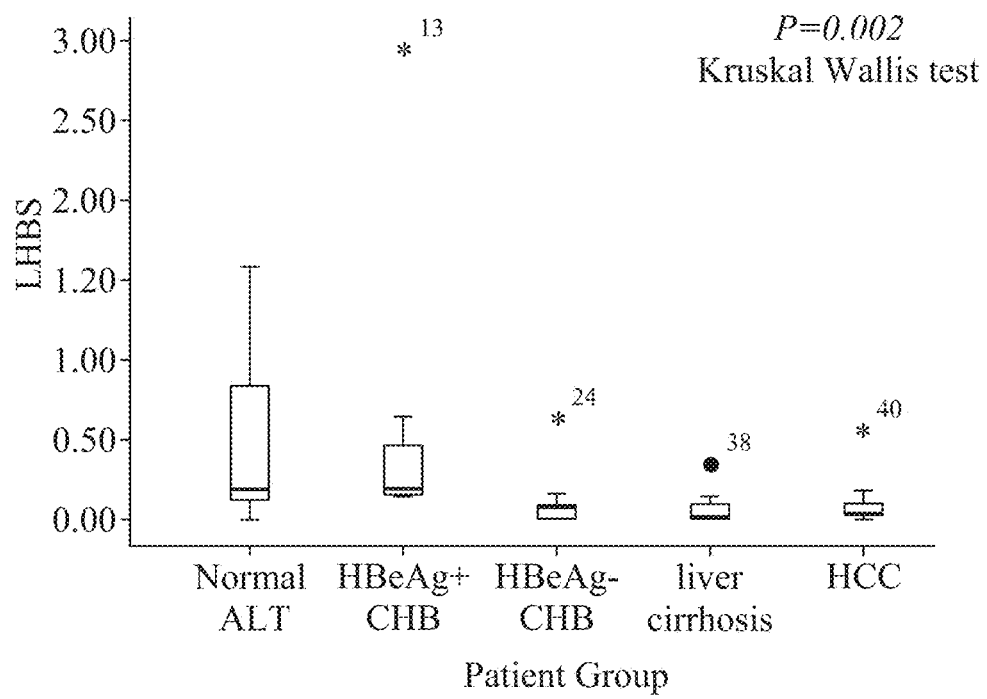
FIG. 5 illustrates a box plot showing serum LHBS levels of various patient groups in various HBV infection phases detected by the LHBS chemiluminescent sandwich ELISA system according to an embodiment of the present invention.

Reference was made to FIG. 5, which illustrated a box plot showing serum LHBS levels of various patient groups in various HBV infection phases detected by the LHBS chemiluminescent sandwich ELISA system according to an embodiment of the present invention.

The results of FIG. 5 analyzed by Kruskal Wallis test indicated that the ones in the immune tolerance phase, characterized with normal ALT but high viral titer, and exhibited the highest LHBS levels. The HBeAg(+) chronic HBV (CHB) carriers, which display medium viral titer, showed the next highest. Whereas the HBeAg(−) CHB, liver cirrhosis, and HCC groups, which usually display very low viral titers, were in significantly lower LHBS levels than the former two groups (p value 0.002) (FIG. 5).

In addition, the Pearson Correlation analysis showed that the LHBS level was correlated with viral DNA titer in these patients (r=0.36). These results indicated that the serum LHBS level was indicative of viral infection phase and could be used as an effective biomarker for it.

Figure 6A:
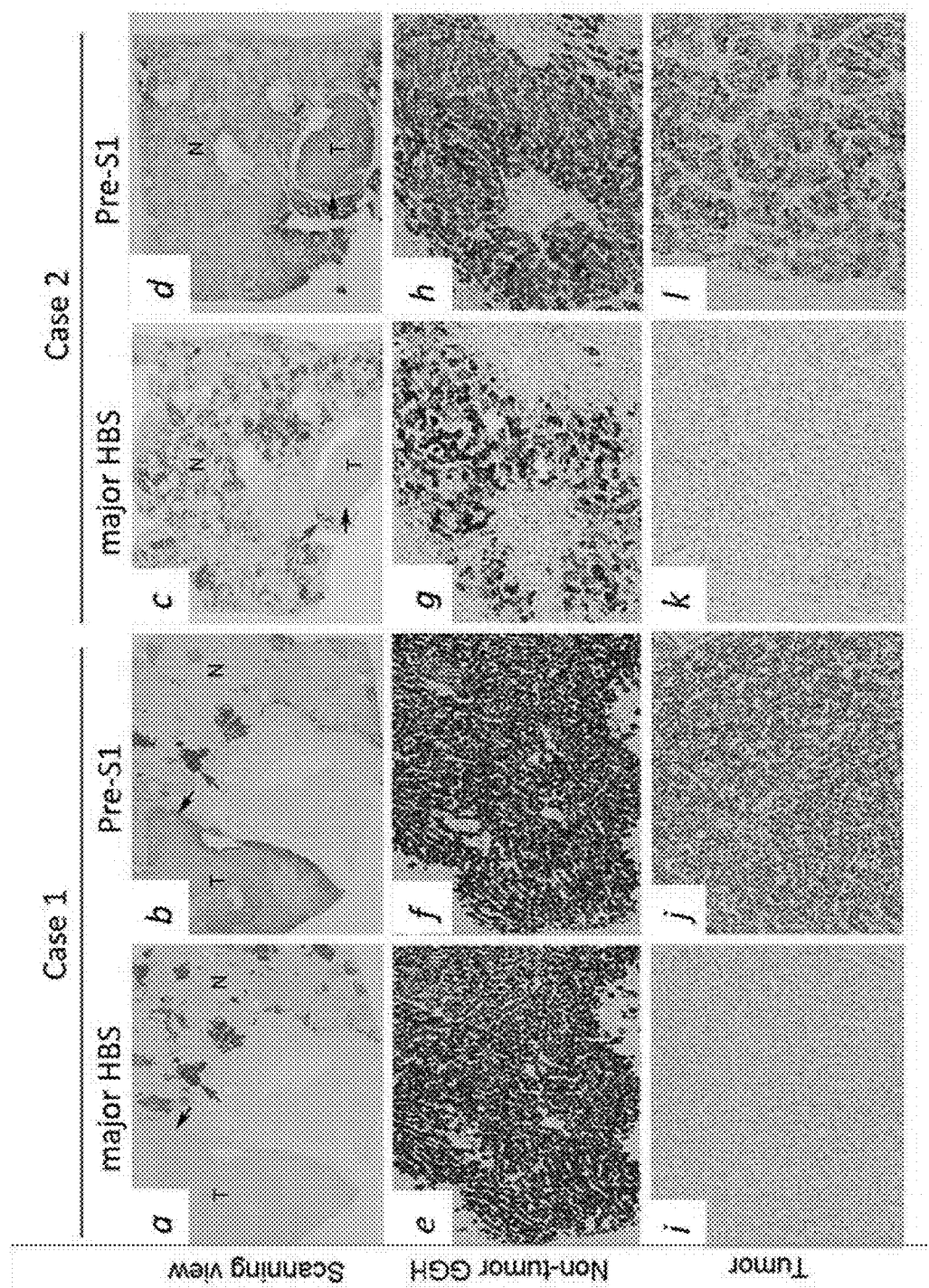
FIGS. 6A to 6C illustrate expression of the major HBS and LHBS in the peritumorous and tumorous regions of the HCC patients according to an embodiment of the present invention, which are analyzed by IHC staining (FIGS. 6A and 6B) and western blotting (FIG. 6C).
Figure 6B:
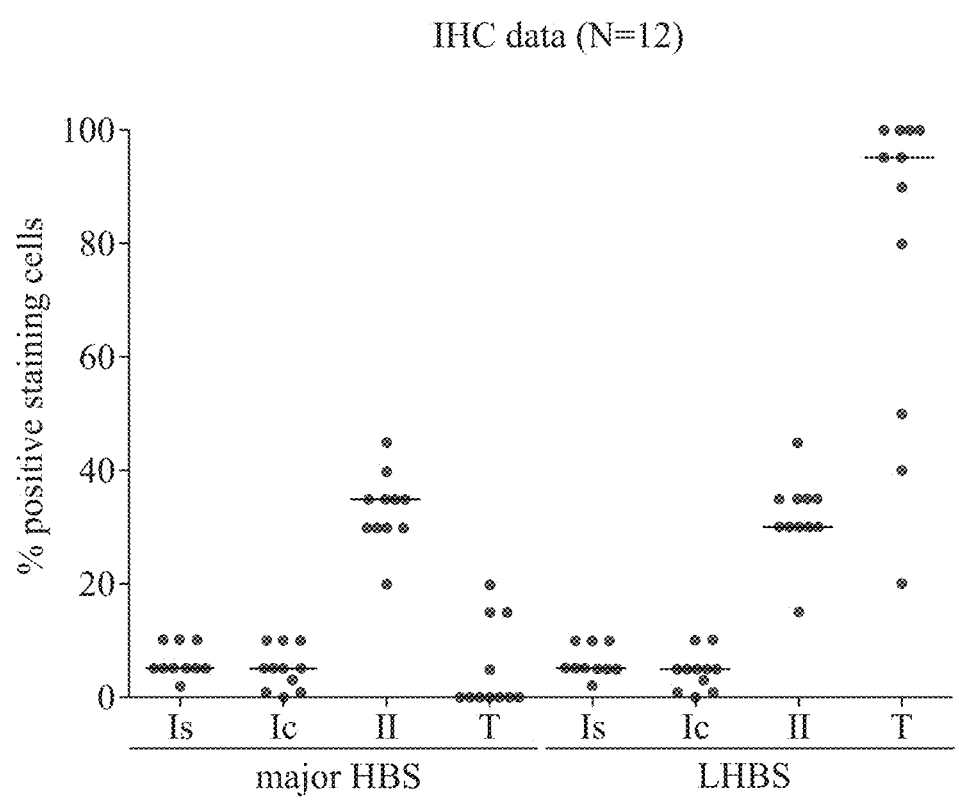
Figure 6C:
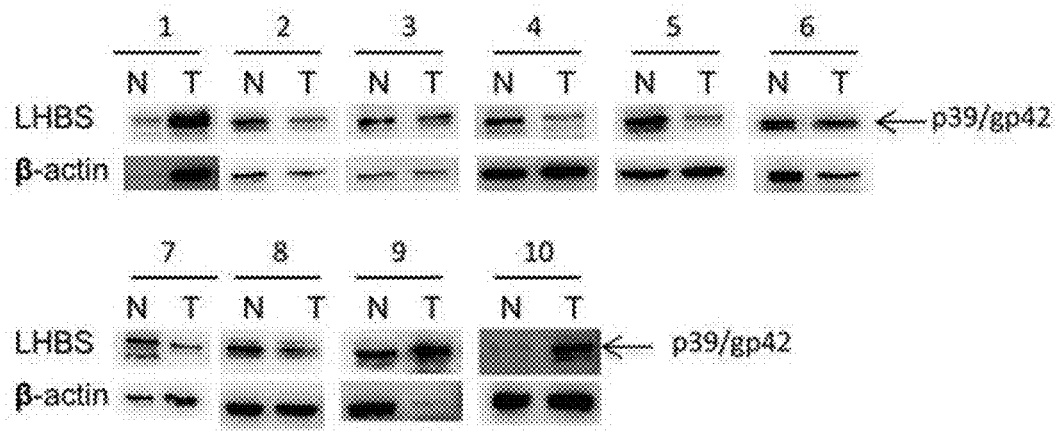
Figure 6C:
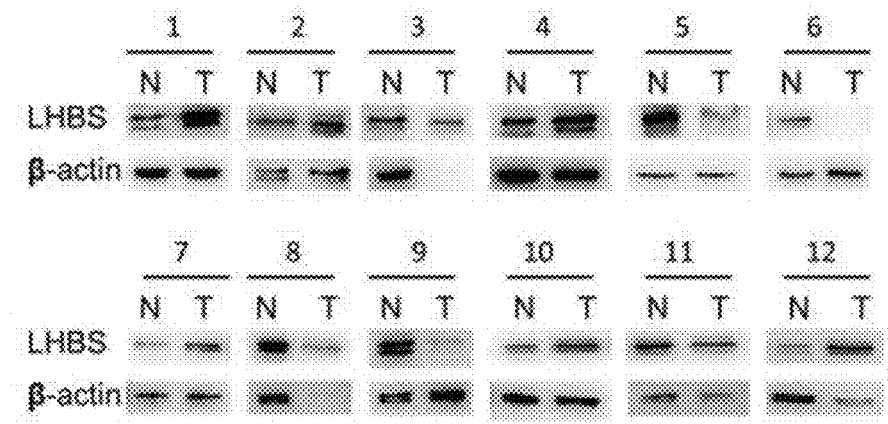

Reference was made to FIGS. 6A to 6C, which illustrated expression of the major HBS and LHBS in the peritumorous and tumorous regions of the HCC patients according to an embodiment of the present invention, which were analyzed by IHC staining (FIGS. 6A and 6B) and western blotting (FIG. 6C). FIG. 6A showed IHC images of two representative cases, in which panels a, b, e, f, l and j showed the IHC results of Case 1, and panels c, d, g, h, k and l showed the IHC results of Case 2. Panels a to d showed the scanning views. Panels a and c showed that major HBS was expressed in nontumorous regions as clusters of GGH but was not expressed in the tumor. Panels b and d showed that large HBS was expressed in both nontumorous and tumorous regions. Panels e to h showed that magnified views of the GGH in nontumorous liver (corresponding to the area at the red arrow in the scanning views of panels a to d). Panels i to l showed that magnified views of the tumor (corresponding to the area at the black arrow of panels a to d). FIG. 6B showed the summary of the IHC results in HCC cases (n=12). The percentage (median 6 SEM) of cells with positive staining in the GGH type I scattered, type I clustered, type II, and tumorous regions is shown. For major HBS and LHBS, the IHC results with the antibodies recognizing the major S and pre-S1 regions are shown, respectively. The bar indicates the median value of each set of data. FIG. 6C showed LHBS western blotting in the peritumorous and tumorous regions of the HCC cases (n=22). Both wild-type (n=10) and pre-S2 mutant (n=12) cases, preidentified by the Pre-S Gene Chip assay, were analyzed. Human 293T cells, transfected with the wild-type, pre-S1, and pre-S2 mutant HBS genes, were used to detect the specificity of the monoclonal antibody to HBS. Arrows of FIG. 6C were at the LHBS of p39/gp42 kDa. Beta (β)-actin served as internal control. Abbreviations of FIGS. 6A to 6C were listed as follows: C, control; Ic, GGH type I clustered; II, GGH type II; Is, GGH type I scattered; N, nontumorous; T, tumor; WT, wild type.

Figure 7A:
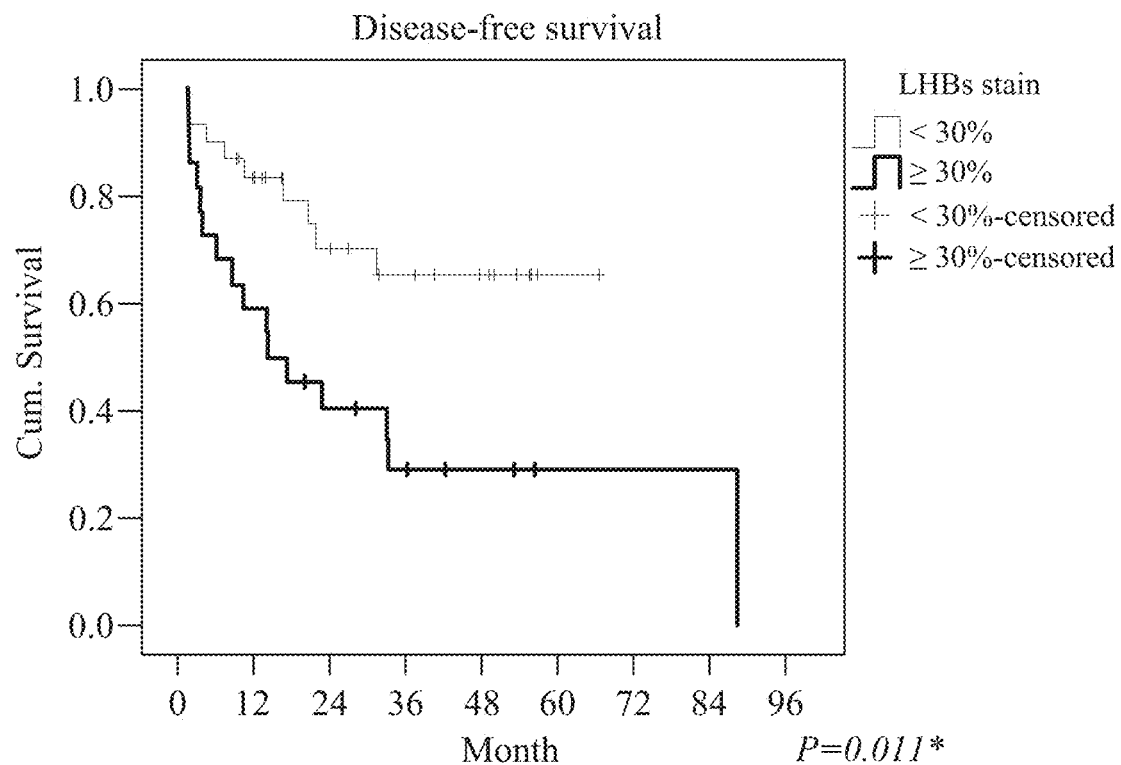
FIGS. 7A and 7B show Kaplan-Meier analysis of tissue LHBs stain expression in relation to disease-free survival (DFS) and overall survival (OS) in the HCC clinical cohort according to an embodiment of the present invention.
Figure 7B:
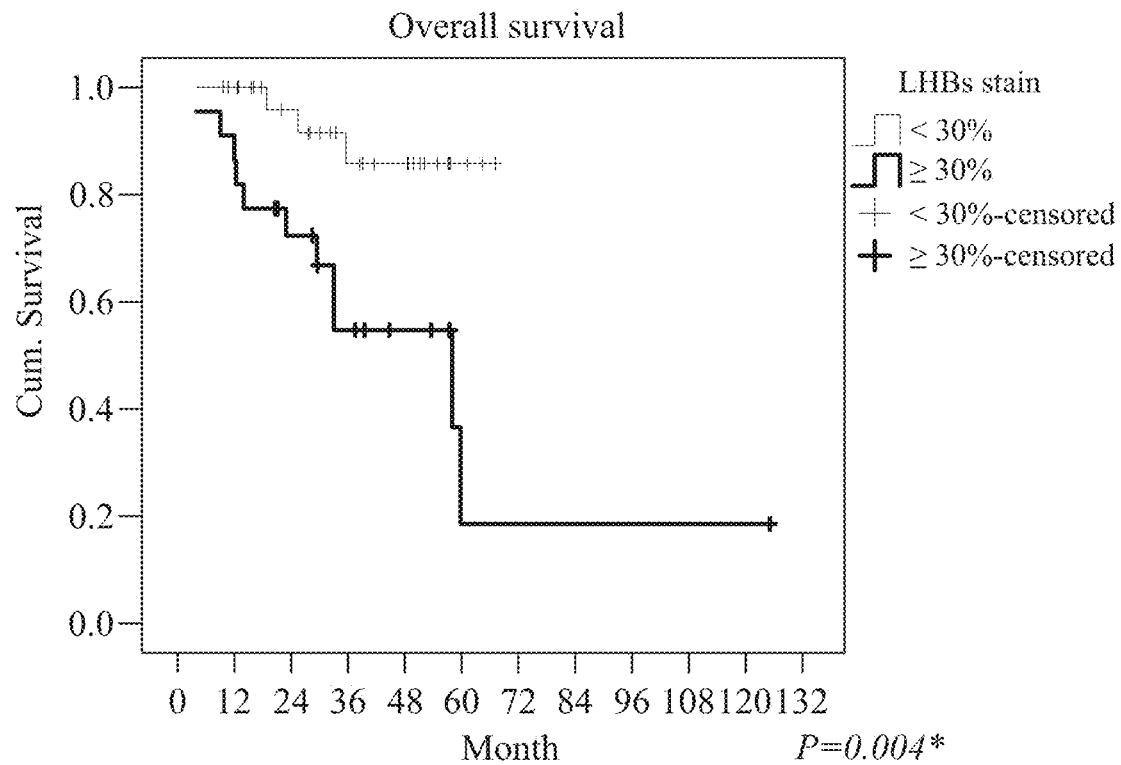

Reference was made to FIGS. 7A and 7B, which showed Kaplan-Meier analysis of tissue LHBs stain expression in relation to disease-free survival (DFS) and overall survival (OS) in the HCC clinical cohort according to an embodiment of the present invention. *P<0.05. High LHBs expression in liver tissue was significantly associated with worse DFS (P=0.011) and OS (P=0.004).

Figure 8A:
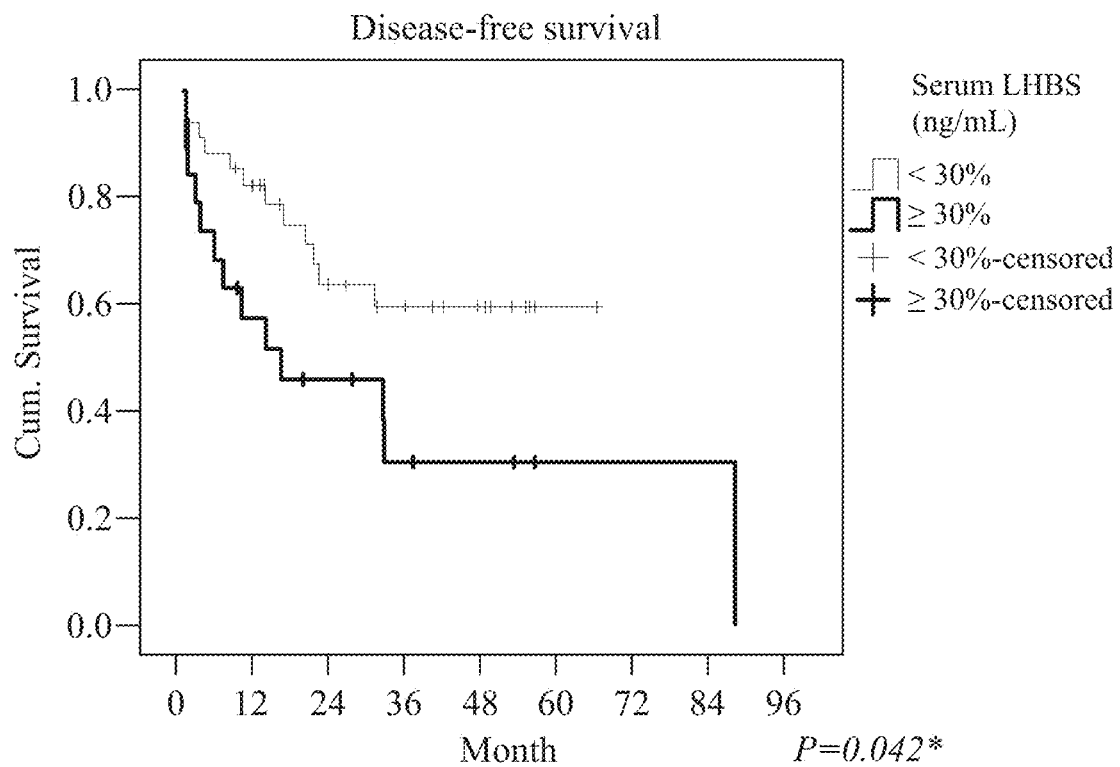
FIGS. 8A and 8B show Kaplan-Meier analysis of serum LHBs expression by ELISA in relation to disease-free survival (DFS) and overall survival (OS) in the HCC clinical cohort according to another embodiment of the present invention.
Figure 8B:
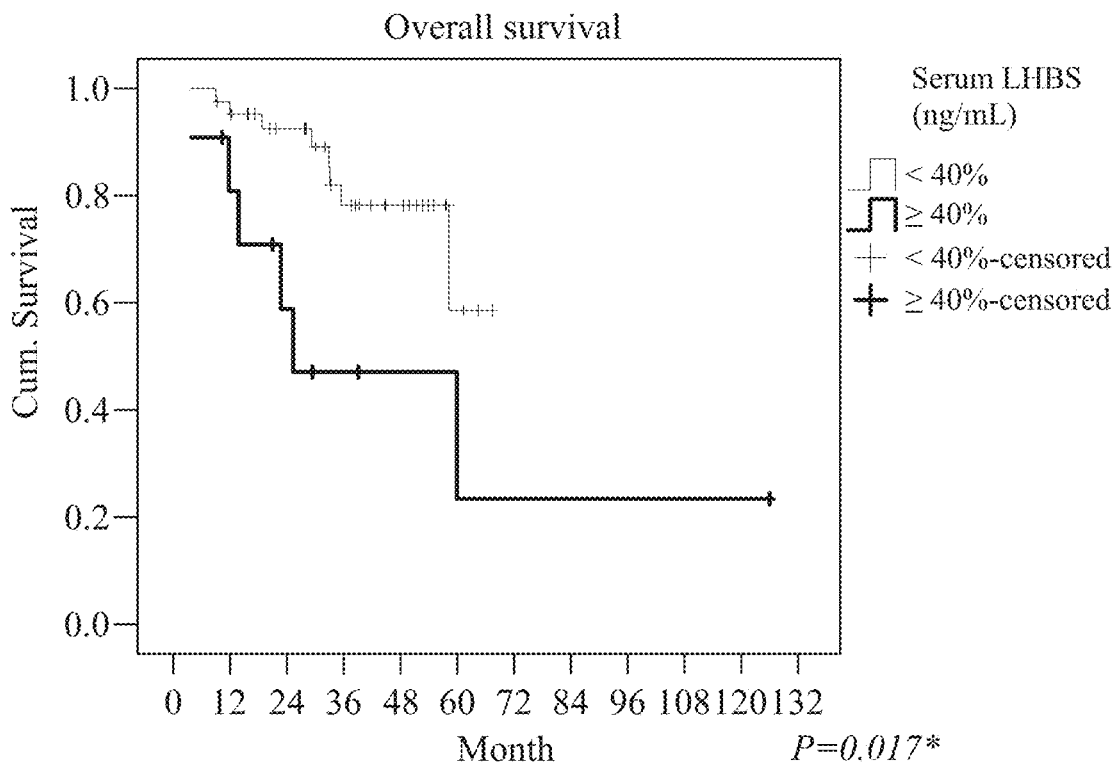

Reference was made to FIGS. 8A and 8B, which showed Kaplan-Meier analysis of serum LHBs expression by ELISA in relation to disease-free survival (DFS) and overall survival (OS) in the HCC clinical cohort according to another embodiment of the present invention. *P<0.05. High LHBs expression in serum was also significantly associated with worse DFS (P=0.042) and OS (P=0.017).

Prognostic significance of clinicopathological indicators, HBsAg expression, and HBV serum profiles for disease-free survival in hepatocellular carcinoma patients was listed in TABLE 1. A univariate analysis showed that viral load (P=0.043), tumor size (P=0.001), vascular invasion (P=0.044), AJCC stage (P=0.024), serum LHBS (P=0.048) and tissue LHBS stain (P=0.014) were significant predictors of worse DFS (TABLE 1). Multivariate analysis showed that tissue LHBS stain (P=0.022, HR=2.650, CI=1.154-6.087) and tumor size (P=0.001, HR=3.979, CI=1.750-9.048) were independently associated with DFS (TABLE 1).

TABLE 1

Prognostic significance of clinicopathological indicators, HBsAg expression, and HBV serum profiles for disease-free survival in hepatocellular carcinoma patients.

| Factor | Group | DFS univariate | | | DFS multivariate | | |
|---|---|---|---|---|---|---|---|
| | | HR | 95% CI | P | HR | 95% CI | P |
| Age | <60/≥60 years | 0.517 | 0.205-1.305 | 0.163 | | | |
| Sex | Male/female | 0.538 | 0.160-1.805 | 0.315 | | | |
| Cirrhosis | −/+ | 1.121 | 0.479-2.621 | 0.793 | | | |
| HBeAg | −/+ | 1.173 | 0.486-2.833 | 0.723 | | | |
| Serum AFP | <200/≥200 ng/mL | 1.904 | 0.710-5.108 | 0.201 | | | |
| Viral load | <20000/≥20000 IU/mL | 2.354 | 1.028-5.394 | 0.043* | | | |
| Differentiation | W/M-P | 1.652 | 0.489-5.576 | 0.419 | | | |
| Multifocal tumor | −/+ | 1.703 | 0.571-5.082 | 0.340 | | | |
| Satellite nodule | −/+ | 1.600 | 0.618-4.141 | 0.333 | | | |
| Tumor size | <5/≥5 cm | 4.140 | 1.833-9.352 | 0.001* | 3.979 | 1.750-9.048 | 0.001* |
| Vascular invasion | −/+ | 2.317 | 1.023-5.248 | 0.044* | | | |
| AJCC stage | I~II/IIIA~C | 2.762 | 1.142-6.681 | 0.024* | | | |
| Pre-S deletion | −/+ | 0.852 | 0.379-1.916 | 0.698 | | | |
| Serum HBs | <1000/≥1000 ng/mL | 1.806 | 0.798-4.088 | 0.156 | | | |
| Serum LHBs | <25/≥25 ng/mL | 2.246 | 1.077-5.010 | 0.048* | | | |
| Small HBs stain | <30/≥30% | 1.686 | 0.748-3.802 | 0.208 | | | |
| LHBs stain | <30/≥30% | 2.811 | 1.229-6.433 | 0.014* | 2.650 | 1.154-6.087 | 0.022* |

*$P < 0.05$. DFS, disease-free survival; Tumor differentiation according to WHO system; AFP, alpha-fetoprotein; AJCC, American Joint Committee on Cancer 2010.

TABLE 2

Prognostic significance of clinicopathological indicators, HBsAg expression, and HBV serum profiles for disease-free survival in hepatocellular carcinoma patients when LHBs stain not included therein.

| Factor | Group | DFS univariate | | | DFS multivariate | | |
|---|---|---|---|---|---|---|---|
| | | HR | 95% CI | P | HR | 95% CI | P |
| Age | <60/≥60 years | 0.517 | 0.205-1.305 | 0.163 | | | |
| Sex | Male/female | 0.538 | 0.160-1.805 | 0.315 | | | |
| Cirrhosis | −/+ | 1.121 | 0.479-2.621 | 0.793 | | | |
| HBeAg | −/+ | 1.173 | 0.486-2.833 | 0.723 | | | |
| Serum AFP | <200/≥200 ng/mL | 1.904 | 0.710-5.108 | 0.201 | | | |
| Viral load | <20000/≥20000 IU/mL | 2.354 | 1.028-5.394 | 0.043* | | | |
| Differentiation | W/M-P | 1.652 | 0.489-5.576 | 0.419 | | | |
| Multifocal tumor | −/+ | 1.703 | 0.571-5.082 | 0.340 | | | |
| Satellite nodule | −/+ | 1.600 | 0.618-4.141 | 0.333 | | | |
| Tumor size | <5/≥5 cm | 4.140 | 1.833-9.352 | 0.001* | 4.443 | 1.907-10.353 | 0.001* |
| Vascular invasion | −/+ | 2.317 | 1.023-5.248 | 0.044* | 2.590 | 1.157-5.797 | 0.021 |
| AJCC stage | I~II/IIIA~C | 2.762 | 1.142-6.681 | 0.024* | | | |
| Pre-S deletion | −/+ | 0.852 | 0.379-1.916 | 0.698 | | | |
| Serum HBs | <1000/≥1000 ng/mL | 1.806 | 0.798-4.088 | 0.156 | | | |
| Serum LHBs | <25/≥25 ng/mL | 2.246 | 1.077-5.010 | 0.048* | 2.267 | 1.001-5.137 | 0.049* |

*$P < 0.05$. DFS, disease-free survival; Tumor differentiation according to WHO system; AFP, alpha-fetoprotein; AJCC, American Joint Committee on Cancer 2010.

As shown in TABLE2, since serum was obtained by more non-invasive methods, the performance of serum LHBS testing could be evaluated instead of tissue LHBS stain in multivariate analysis. Multivariate analysis showed that serum LHBS (P=0.049, HR=2.267, CI=1.001-5.137), tumor size (P=0.001, HR=4.443, CI=1.907-10.353) and vascular invasion (P=0.021, HR=2.590, CI=1.157-5.797) were independently associated with DFS (TABLE 2).

Example 4: LHBS could Potentially Allow Therapeutic Targeting by CAR-T Cells or T-Cell Engager Antibodies The single-chain variable fragment (ScFv) genes of the monoclonal antibodies generated in this Example were cloned into the CAR-T vector to construct a pre-S1 ScFv-expressing CAR-T plasmid. The pre-S1 ScFv CAR-T constructs were transfected into the T cells. After mixing the LHBS (+) hepatocytes with the pre-S1 ScFv (+) T cells, the T cells could recognize the LHBS (+) hepatocytes, detected by the analysis of flow cytometry, and the result was shown in FIG. 9.

Figure 9:
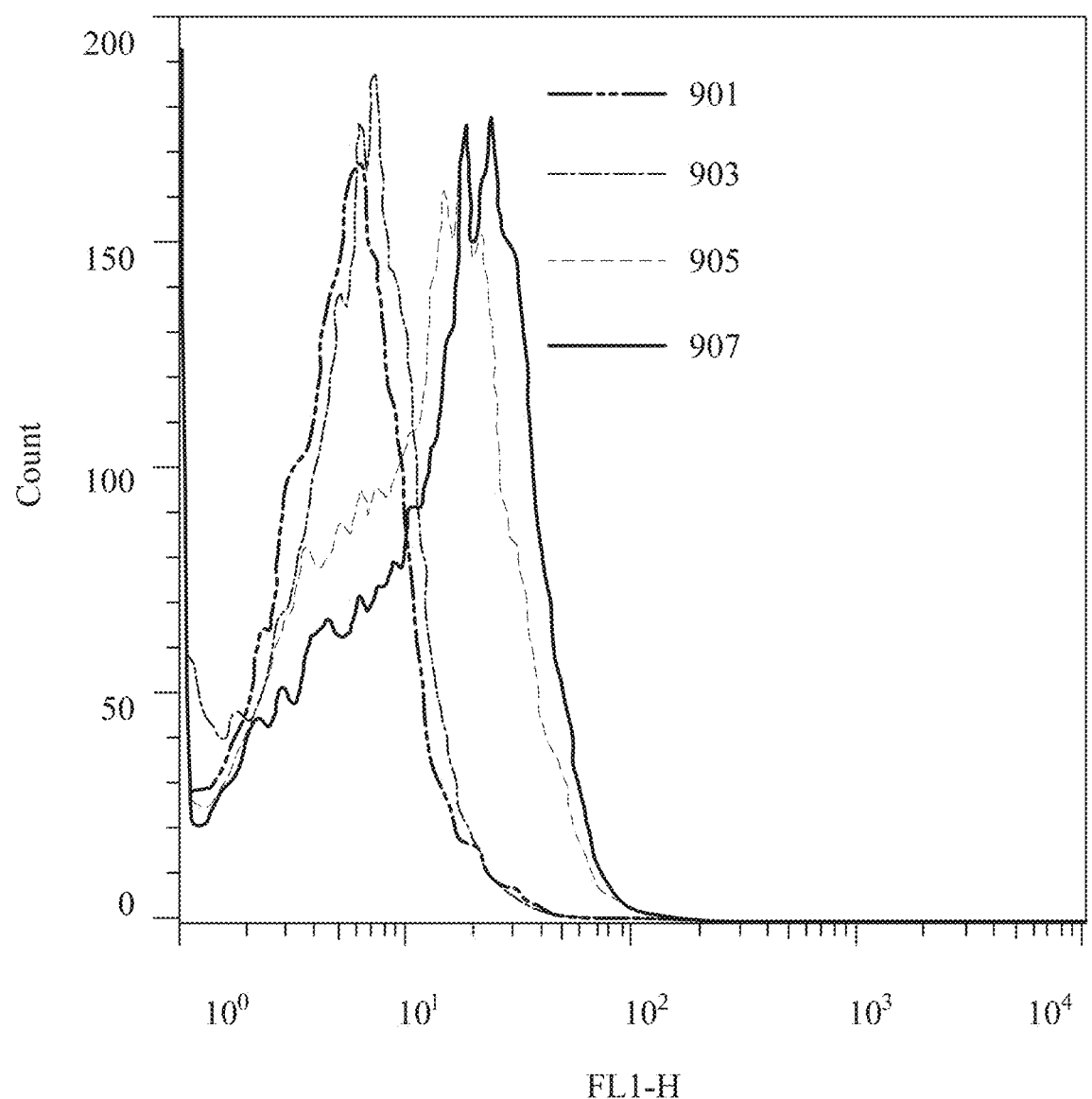
FIG. 9 shows the result of recognition of the LHBS monoclonal antibodies to LHBS in the HBV (+) live HepAD38 cells analyzed by flow cytometry according to an embodiment of the present invention.

Reference was made to FIG. 9, which showed the results of recognition of the LHBS monoclonal antibodies to LHBS in the HBV (+) live HepAD38 cells analyzed by flow cytometry according to an embodiment of the present invention. In FIG. 9, the curve 901 referred to autologous antibodies. The curve 903 referred to "Secondary ab 488" as negative control antibody. The curve 905 referred to LHBS monoclonal antibody clone "7-21-5", and the curve 907 referred to another LHBS monoclonal antibody clone "8-17-1", both of which were against LHBS pre-S1 region peptides spanning amino acid 21 to 47. "FL1-H" referred to fluorescence intensity. As shown in FIG. 9, the LHBS antibodies as shown by the curve 905 and the curve 907 could bind to the LHBS, indicating that LHBS protruded at the outer surface of the HBV (+) live hepatocyte. Therefore, LHBS could potentially serve as a target molecule for CAR-T cell therapy approach.

Timely anti-viral therapy is the most important approach to prevent HBV-related HCC, which is among the top death-causing cancers in the world. Up to now, the most common biomarker for the anti-viral therapy efficacy is viral DNA titer, whose detection requires tedious experimental processes including DNA extraction and real-time PCR. In the aforementioned examples, it is found that the viral LHBS is highly correlated with viral replication activity in the CHB carriers with the highest level in the immune tolerance phase and lowest in cirrhosis and HCC. It also showed high correlation with DNA titer. A sensitive and simple ELISA method is developed as above to detect LHBS as an indicator for viral titer in serum. With the adaptation of chemiluminescent substrate in the ELISA system, the method provides highly sensitive and quantitative measurement of LHBS. The dynamic range of the measurement reaches approximately 100-fold, which provides reliable measurement for the samples in wide range of concentrations.

With the direct detection of the protein in serum, the kit and immunoassay of in vitro quantifying LHBS are much more time- and cost-effective than viral DNA tittering. Therefore serum LHBS stands as an advantageously early biomarker for anti-viral therapeutic efficacies. For example, a biomarker set for non-invasively analyzing HBV infection phases in a biological sample can be provided, which comprises a first biomarker having a first polypeptide of SEQ ID NO: 1, a second biomarker set having a second polypeptide of SEQ ID NO: 2 and a third biomarker having a third polypeptide of SEQ ID NO: 3.

In summary, specific sequences of nucleic acid and amino acids, specific antigen, specific patient groups, specific analysis models or specific evaluating methods are exemplified for clarifying the kit and immunoassay of in vitro quantifying LHBS and biomarker set for non-invasively analyzing phases of HBV infection in the biological sample. However, as is understood by a person skilled in the art, other sequences of nucleic acid and amino acids, other antigen, other patient groups, other analysis models or other evaluating methods can be also adopted in the kit and immunoassay of in vitro quantifying LHBS and biomarker set for non-invasively analyzing phases of HBV infection in the biological sample without departing the spirit and scope of the present invention of the present invention rather than being limited as aforementioned. For example, the monoclonal antibodies can be chimerized or humanized for different application, thereby beneficially elevating sensitivity and dynamic breadth of detecting LHBS. In other examples, the set of monoclonal antibodies also can be applied to predict, diagnose or treat a chronic liver disease via those biomarkers in a subject in need thereof.

According to the embodiments of the present invention, the kit and immunoassay of in vitro quantifying LHBS and the biomarker set for non-invasively analyzing phases of HBV infection in the biological sample of the present invention includes monoclonal antibodies having respective binding specificity for specific regions of LHBS, thereby increasing sensitivity and dynamic breadth of detecting LHBS in a biological sample. The invention also provides a biomarker set corresponding to the specific regions of LHBS, and the biomarker set can be specifically recognized by monoclonal antibodies, for analyzing phases of HBV infection and hepatoma prognosis in a biological sample in a biological sample.

Although the present invention has been described in considerable detail with reference to certain embodiments thereof, other embodiments are possible. Therefore, the spirit and scope of the appended claims should not be limited to the description of the embodiments contained herein.

What is claimed is:

1. A kit of in vitro quantifying large surface protein of hepatitis B virus (LHBS) in a biological sample, comprising:
   a blocking solution;
   a set of monoclonal antibodies for detecting biomarkers in the biological sample, comprising:
      a first monoclonal antibody immobilized in multiple discrete locations on a solid support and immersed in the blocking solution, wherein the first monoclonal antibody has a binding specificity for a first polypeptide listed as SEQ ID NO: 1 in a biological sample, and the first monoclonal antibody comprises heavy chain CDR 1 to 3 sequences consisting of SEQ ID NOs: 4 to 6 and light chain CDR 1 to 3 sequences consisting of SEQ ID NOs: 7 to 9; and
   at least one of a second monoclonal antibody and a third monoclonal antibody, wherein the second monoclonal antibody and the third monoclonal antibody are respectively linked to a label, the second monoclonal antibody has a binding specificity for a second polypeptide listed as SEQ ID NO: 2 in the biological sample, and the third monoclonal antibody has a binding specificity for a third polypeptide listed as SEQ ID NO: 3 in the biological sample, the second monoclonal antibody comprises heavy chain CDR 1 to 3 sequences consisting of the sequences listed as SEQ ID NO: 10 to 12 and light chain CDR 1 to 3 sequences consisting of the sequences listed as SEQ ID NO: 13 to 15, and the third monoclonal antibody comprises heavy chain CDR 1 to 3 sequences consisting of the sequences listed as SEQ ID NO: 16 to 18 and light chain CDR 1 to 3 sequences consisting of the sequences listed as SEQ ID NO: 19 to 21; and a detection reagent capable of reacting with the label and forming a detectable product.

2. The kit of claim 1, wherein the detection reagent is a chromogenic substrate.

3. The kit of claim 1, wherein the biological sample comprises a tissue and/or a fluid sample.

4. The kit of claim 3, wherein the tissue comprises a solid tissue and/or a soft tissue.

5. The kit of claim 3, wherein the fluid sample comprises serum, blood, urine, semen, cerebrospinal fluid (CSF) and saliva.

6. A set of monoclonal antibodies for predicting, diagnosing or treating a chronic liver disease via biomarkers in a subject in need thereof, comprising:

a first monoclonal antibody or a first antigen-binding fragment thereof for specifically detecting a first polypeptide, wherein the first monoclonal antibody or the first antigen-binding fragment thereof comprises heavy chain CDR 1 to 3 sequences consisting of SEQ ID NOs: 4 to 6 and light chain CDR 1 to 3 sequences consisting of SEQ ID NOs: 7 to 9; and at least one of a second monoclonal antibody or a second antigen-binding fragment thereof for specifically detecting a second polypeptide, and a third monoclonal antibody or a third antigen-binding fragment thereof for specifically detecting a third polypeptide, wherein the second monoclonal antibody or the second antigen-binding fragment thereof comprises heavy chain CDR 1 to 3 sequences consisting of the sequences listed as SEQ ID NO: 10 to 12 and light chain CDR 1 to 3 sequences consisting of the sequences listed as SEQ ID NO: 13 to 15; and wherein the third monoclonal antibody or the third antigen-binding fragment thereof comprises heavy chain CDR 1 to 3 sequences consisting of the sequences listed as SEQ ID NO: 16 to 18 and light chain CDR 1 to 3 sequences consisting of the sequences listed as SEQ ID NO: 19 to 21.

7. The set of the monoclonal antibodies of claim 6, wherein the chronic liver disease is selected from the group consisting of a latent HBV infection, a liver cirrhosis and a hepatocellular carcinoma.

8. The set of the monoclonal antibodies of claim 6, wherein the biomarkers comprise a first biomarker having the first polypeptide of SEQ ID NO: 1, a second biomarker having the second polypeptide of SEQ ID NO: 2, and a third biomarker having the third polypeptide of SEQ ID NO: 3.

9. The set of the monoclonal antibodies of claim 6, wherein the first monoclonal antibody or the first antigen-binding fragment thereof comprises a heavy chain sequence listed as SEQ ID NO: 22 and a light chain sequence listed as SEQ ID NO: 23.

10. The set of the monoclonal antibodies of claim 6, wherein the second monoclonal antibody or the second antigen-binding fragment thereof comprises a heavy chain sequence listed as SEQ ID NO: 24 and a light chain sequence listed as SEQ ID NO: 25.

11. The set of the monoclonal antibodies of claim 6, wherein the third monoclonal antibody or the third antigen-binding fragment thereof comprises a heavy chain sequence listed as SEQ ID NO: 26 and a light chain sequence listed as SEQ ID NO: 27.

12. The set of the monoclonal antibodies of claim 9, wherein the first monoclonal antibody comprises the heavy chain encoded by a sequence listed as SEQ ID NO: 28 and the light chain encoded by a sequence listed as SEQ ID NO: 29.

13. The set of the monoclonal antibodies of claim 10, wherein the second monoclonal antibody comprises the heavy chain encoded by a sequence listed as SEQ ID NO: 30 and the light chain encoded by a sequence listed as SEQ ID NO: 31.

14. The set of the monoclonal antibodies of claim 11, wherein the third monoclonal antibody comprises the heavy chain encoded by a sequence listed as SEQ ID NO: 32 and the light chain encoded by a sequence listed as SEQ ID NO: 33.

15. The set of the monoclonal antibodies of claim 6, wherein the first monoclonal antibody or the first antigen-binding fragment thereof, the second monoclonal antibody or the second antigen-binding fragment thereof, and the third monoclonal antibody or the third antigen-binding fragment thereof, are antigen binding domains of chimeric antigen receptors (CARs) of engineered T cells.

16. The set of the monoclonal antibodies of claim 6, wherein the first monoclonal antibody or the first antigen-binding fragment thereof, the second monoclonal antibody or the second antigen-binding fragment thereof, and the third monoclonal antibody or the third antigen-binding fragment thereof, are antigen binding domains of antibody-drug conjugates (ADCs).

* * * * *